US010352734B2

(12) United States Patent
Ricks et al.

(10) Patent No.: US 10,352,734 B2
(45) **Date of Patent: *Jul. 16, 2019**

(54) HINGE SENSOR FOR BARRIER

(71) Applicant: Vivint, Inc., Provo, UT (US)

(72) Inventors: Sean Ricks, American Fork, UT (US); Jeremy B. Warren, Draper, UT (US)

(73) Assignee: Vivint, Inc., Provo, UT (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/693,583

(22) Filed: Apr. 22, 2015

(65) Prior Publication Data

US 2016/0084678 A1 Mar. 24, 2016

Related U.S. Application Data

(63) Continuation-in-part of application No. 14/490,041, filed on Sep. 18, 2014, now Pat. No. 9,366,065.

(51) Int. Cl.

| | |
|---|---|
| ***E05F 7/00*** | (2006.01) |
| ***G01D 5/40*** | (2006.01) |
| ***E05D 11/00*** | (2006.01) |
| ***G01D 5/12*** | (2006.01) |

(52) U.S. Cl.

CPC ............... *G01D 5/40* (2013.01); *E05D 11/00* (2013.01); *G01D 5/12* (2013.01); *E05F 7/00* (2013.01); *E05Y 2400/322* (2013.01); *E05Y 2400/354* (2013.01); *E05Y 2900/132* (2013.01)

(58) Field of Classification Search

CPC combination set(s) only.
See application file for complete search history.

(56) References Cited

U.S. PATENT DOCUMENTS

| | | | |
|---|---|---|---|
| 6,975,224 | B2 | 12/2005 | Galley, III et al. |
| 7,122,944 | B2 | 10/2006 | Grimshaw |
| 7,330,007 | B2 | 2/2008 | Sugiura et al. |
| 7,610,684 | B2 | 11/2009 | Steinich |
| 7,916,018 | B2 | 3/2011 | Eskildsen et al. |
| 8,764,071 | B2 | 7/2014 | Lanigan et al. |

(Continued)

FOREIGN PATENT DOCUMENTS

WO 2014102705 A1 7/2014

OTHER PUBLICATIONS

PCT International Search Report for International Application No. PCT/US2015/048028, dated Nov. 12, 2015 (3 pp.).

(Continued)

*Primary Examiner* — Nabil H Syed
*Assistant Examiner* — Cal J Eustaquio
(74) *Attorney, Agent, or Firm* — Holland & Hart LLP

(57) ABSTRACT

Methods and systems are described for determining operation of an openable barrier and direction of movement of a person through an opening controlled by the barrier. A method includes detecting with a hinge sensor a closed position for the barrier, the hinge sensor being mounted to a hinge of the barrier, determining with the hinge sensor when the barrier changes position from the closed position to an open position, detecting with at least one motion sensor motion of an object in proximity to the opening, and determining a direction of movement of the object through the opening based on whether the motion is detected before or after detecting the change in position of the barrier.

19 Claims, 17 Drawing Sheets

(56) References Cited

U.S. PATENT DOCUMENTS

| | | | | |
|---|---|---|---|---|
| 8,786,435 | B2 | 7/2014 | Barnett et al. | |
| 2004/0046401 | A1* | 3/2004 | Watanabe | E05F 15/70 292/262 |
| 2005/0064914 | A1 | 3/2005 | Gough | |
| 2006/0038673 | A1* | 2/2006 | Chapman | G07C 9/00714 340/528 |
| 2006/0267780 | A1* | 11/2006 | Adams | A61B 5/1113 340/573.1 |
| 2007/0180890 | A1* | 8/2007 | Steinich | E05D 11/00 73/11.01 |
| 2008/0303655 | A1 | 12/2008 | Johnson | |
| 2010/0194563 | A1* | 8/2010 | Berner | E05D 11/00 340/545.1 |
| 2010/0223853 | A1 | 9/2010 | Wayman et al. | |
| 2013/0081329 | A1 | 4/2013 | French et al. | |
| 2015/0040215 | A1 | 2/2015 | Blodgett et al. | |
| 2017/0260783 | A1 | 9/2017 | Crolley | |

OTHER PUBLICATIONS

PCT International Search Report for International Application No. PCT/US2016/026952, dated Jul. 20, 2016 (3 pp.).

* cited by examiner

HINGE SENSOR FOR BARRIER

BACKGROUND

Advancements in media delivery systems and media-related technologies continue to increase at a rapid pace. Increasing demand for media has influenced the advances made to media-related technologies. Computer systems have increasingly become an integral part of the media-related technologies. Computer systems may be used to carry out several media-related functions. The wide-spread access to media has been accelerated by the increased use of computer networks, including the Internet and cloud networking.

Many homes and businesses use one or more computer networks to generate, deliver, and receive data and information between the various computers connected to computer networks. Users of computer technologies continue to demand increased access to information and an increase in the efficiency of these technologies. Improving the efficiency of computer technologies is desirable to those who use and rely on computers.

With the wide-spread use of computers and mobile devices has come an increased presence of home/business automation and security products. Advancements in mobile devices allow users to monitor and/or control an aspect of a home or business. As automation and security products expand to encompass other systems and functionality in the home and/or businesses, opportunities exist for more accurately monitoring a property and providing functionality in response.

SUMMARY

Methods and systems are described for determining a direction of movement through an opening such as a doorway. The direction of movement information may indicate whether a person or other object is moving into or out of an area such as a room or building (also referred to as ingress and egress). In the context of an automation and/or security system, determining that a person has left the room or building may prompt certain automated functions such as turning off lighting, controlling a thermostat setting, operating an appliance, sounding an alarm, generating a notice, or arming a security feature. The systems and method disclosed herein may utilize motion detection data from one or more motion sensors in combination with door operation data from one or more hinge sensors. The hinge sensor may detect movement of a barrier that controls access through the opening (e.g., movement of a door from a closed position to an open position). The motion sensor may determine movement on one or both sides of the barrier. The timing between when the motion is detected and when the door movement is detected may be used to determine a direction of movement of a person through the opening.

According to at least one embodiment, a method for determining a direction of passage through an opening that is controlled by a barrier is disclosed. The method includes detecting with a hinge sensor a closed position for the barrier, the hinge sensor being mounted to a hinge of the barrier, determining with the hinge sensor when the barrier changes position from the closed position to an open position, detecting with at least one motion sensor motion of an object in proximity to the opening, and determining a direction of movement of the object through the opening based on whether the motion is detected before or after detecting the change in position of the barrier.

In one example, the method may further include wirelessly transmitting data concerning the direction of movement of the object through the opening. The hinge sensor may include a rotatable portion and a fixed portion, and the method may further include fixing a position of the fixed portion relative to the hinge, and rotatably mounting the rotatable portion to the fixed portion, wherein the rotatable portion is arranged in contact with and movable by the barrier. The hinge sensor may include the at least one motion sensor. The at least one motion sensor may be mounted to the barrier. The at least one motion sensor may be mounted to a wall or door frame adjacent to the opening. The at least one motion sensor may include a first motion sensor positioned on an exit side of the opening and a second motion sensor positioned on an entry side of the opening. The method may further include determining with the hinge sensor a movement of the barrier between one open position and another open position. The method may include determining with the hinge sensor a direction of movement of the barrier from the closed position toward the open position, or from the open position toward the closed position. Determining a direction of movement of the object through the opening may include determining that the object passes through the opening in a first direction when motion is detected prior to detecting movement of the barrier, and determining that the object passes through the opening in a second direction when motion is detected after detecting movement of the barrier.

Another embodiment is directed to a sensor assembly for use with a barrier. The sensor assembly includes a hinge sensor mounted to a hinge of the barrier and operable to determine movement of the barrier, and at least one motion sensor operable to detect motion of an object in proximity to an opening controlled by the barrier. The sensor assembly is operable to determine a direction the object passes through the opening based on when the motion is detected relative to when movement of the barrier is detected.

In one example, the hinge sensor may be mounted to a hinge pin of the hinge. The hinge sensor may include a first portion that maintains a fixed position relative to the barrier and a second portion that moves relative to the barrier, and the hinge sensor may determine movement of the barrier based on at least one of a relative position between the first and second portions and a change in position of the second portion. The sensor assembly may include a wireless transmitter configured to transmit data concerning the determined direction of movement of the object through the opening. The at least one motion sensor may be mounted to the hinge. The at least one motion sensor may include a plurality of motion sensors configured to be arranged at different locations relative to the opening.

A further embodiment relates to a direction of movement detecting assembly. The assembly includes a hinge sensor mounted to a hinge of a barrier that is operable to detect movement of the barrier relative to an opening, at least one motion sensor operable to detect motion of an object through or adjacent to the opening, and a controller that receives barrier movement data from the hinge sensor and motion data from the at least one motion sensor and determines a direction of motion of the object through the barrier based at least in part on when the motion is detected relative to when movement of the barrier is detected.

In one example, the controller may be located remotely from the hinge sensor and at least one motion sensor, and the assembly further includes a transceiver operable to wirelessly transmit the barrier movement data and the motion data to the controller. The hinge sensor may include a fixed portion and a moveable portion, and movement of the moveable portion relative to the fixed portion may indicate movement of the barrier relative to the opening. The at least one motion sensor may include a passive infrared sensor.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the spirit and scope of the appended claims. Features which are believed to be characteristic of the concepts disclosed herein, both as to their organization and method of operation, together with associated advantages will be better understood from the following description when considered in connection with the accompanying figures. Each of the figures is provided for the purpose of illustration and description only, and not as a definition of the limits of the claims.

BRIEF DESCRIPTION OF THE DRAWINGS

A further understanding of the nature and advantages of the embodiments may be realized by reference to the following drawings. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

Figure 1:
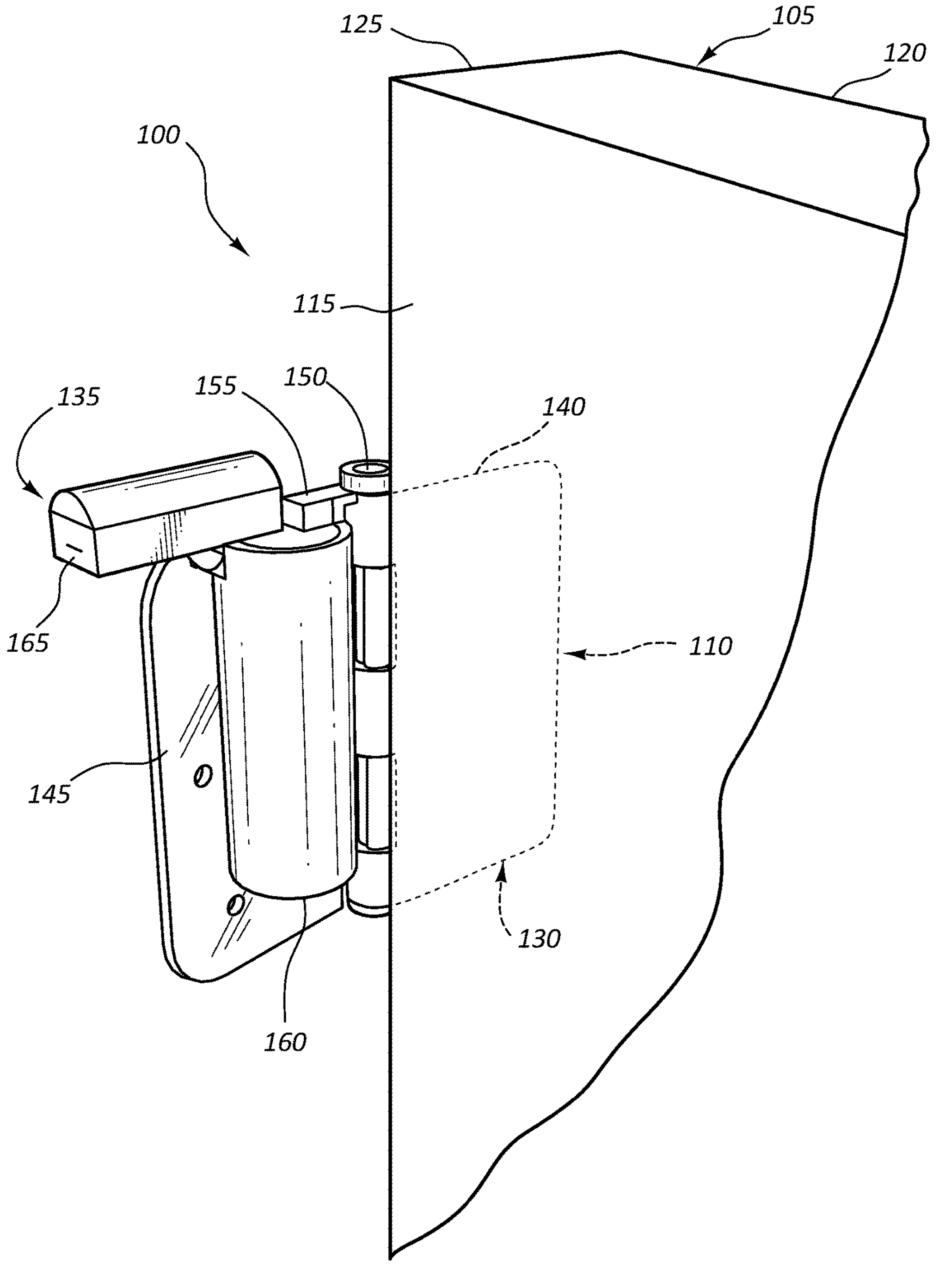
FIG. 1 is perspective view of a door assembly having a door and a hinge assembly in which the systems and methods disclosed herein may be implemented.

While the embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION

The systems and methods described herein relate to home automation and home security, and related security systems and automation for use in commercial and business settings. As used herein, the phrase "home automation system" may refer to a system that includes automation features alone, security features alone, a combination of automation and security features, or a combination of automation, security and other features. While the phrase "home automation system" is used throughout to describe a system or components of a system or environment in which aspects of the present disclosure are described, such an automation system and its related features (whether automation and/or security features) may be generally applicable to other properties such as businesses and commercial properties as well as systems that are used in indoor and outdoor settings.

The systems and methods described herein relate generally to monitoring operation and/or movement of a barrier, such as a door or window. Among other functions, home automation systems typically monitor and control access through barriers such as doors and windows. There are number of challenges related to determining if operation of or entry through a barrier is authorized. Data related to operation of a barrier may be used for a variety of purposes. For example, determining whether operation of or entry through a barrier is authorized may influence whether 1) an alarm is avoided when an authorized person operates or passes through a barrier, or 2) an alarm is properly generated when an unauthorized person operates or passes through the barrier.

One aspect of the present disclosure relates to systems, methods and related devices for determining whether a door, window or other barrier is operated, such as when a person enters or exists a building. One or more sensors may be used to determine such access. For example, one or more hinge sensors may be mounted to a hinge of the barrier. The hinge sensors may determine movement of the barrier (e.g., movement from a closed position to an open position, or movement from one open position to another open position). The hinge sensors may include, for example, a potentiometer, an electrostatic sensor, a piezoelectric sensor, or a magnetic sensor.

Additionally, another sensor, such as a motion sensor, may be used to confirm that the barrier is moved and/or that an object, such as a person, has moved through the opening (e.g., doorway) associated with the barrier. The additional sensor may be positioned at a location spaced apart from the hinge sensor (e.g., at location remote from the hinge sensor but within a room to which the barrier provides access). Additionally, or alternatively, the additional sensor is carried in the same housing as the hinge sensor. The additional sensor may be a different type of sensor than the type of sensor used for the hinge sensor.

The hinge sensor may be integrated into a single housing. The hinge sensor may be mounted directly to a hinge of the barrier, such as to a hinge pin of the hinge. A portion of the hinge sensor may contact the barrier prior to and/or during opening of the barrier. The hinge sensor may include a transmitter and/or a transceiver that wirelessly communicates with a monitoring system, such as a home automation system.

The ability to determine whether the barrier is open or closed and/or whether a person or object passes through a barrier may be one of many factors used to determine use of a building (whether authorized or unauthorized) and/or a pattern of behavior for at least some users of the building. The opening and/or closing function may be associated with a particular person. For example, a person may carry a device that identifies who he/she is (e.g., authentication), and associates the barrier opening with that person. The device may be a cell phone, fob, or other device that is programmable with user identification information. Information about the barrier opening event may be communicated to a home automation system for use in determining patterns of behavior, as well as predict activities associated with the building that may occur in the future. Further, information about the barrier opening may be used to control, for example, whether a handle of the barrier remains locked or is automatically unlocked. The automated control of the barrier may be overridden based on various factors such as, for example, the person operating the barrier, the time of day, or the type of barrier.

As mentioned above, another aspect of the present disclosure relates to use of motion detection in proximity to a barrier and the associated opening controlled by the barrier, may be used in conjunction with operation of the door to determine a direction of movement of a person through the opening. For example, detecting motion on one side of the barrier followed by detected movement of the barrier by the hinge sensor may indicate that the person is passing through the opening in a first direction. Detecting motion on the same side of the barrier after detecting movement of the barrier by the hinge sensor may indicate that the person is passing through the opening in a second, opposite direction.

Figure 2:
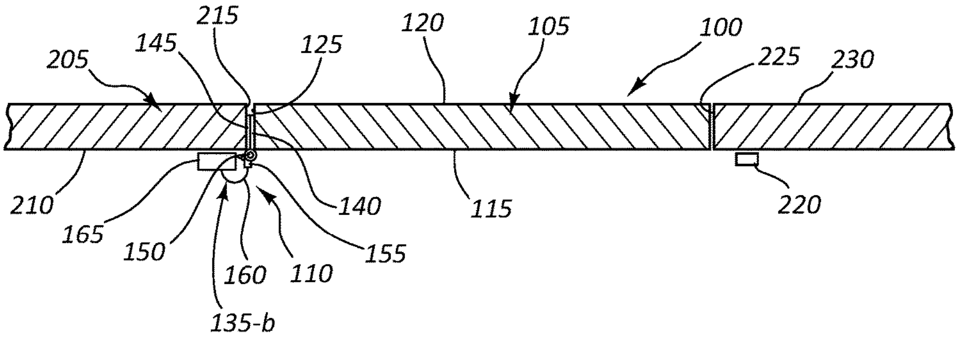
FIG. 2 is a top view of the door assembly shown in FIG. 1 with the door in a closed position.
Figure 3:
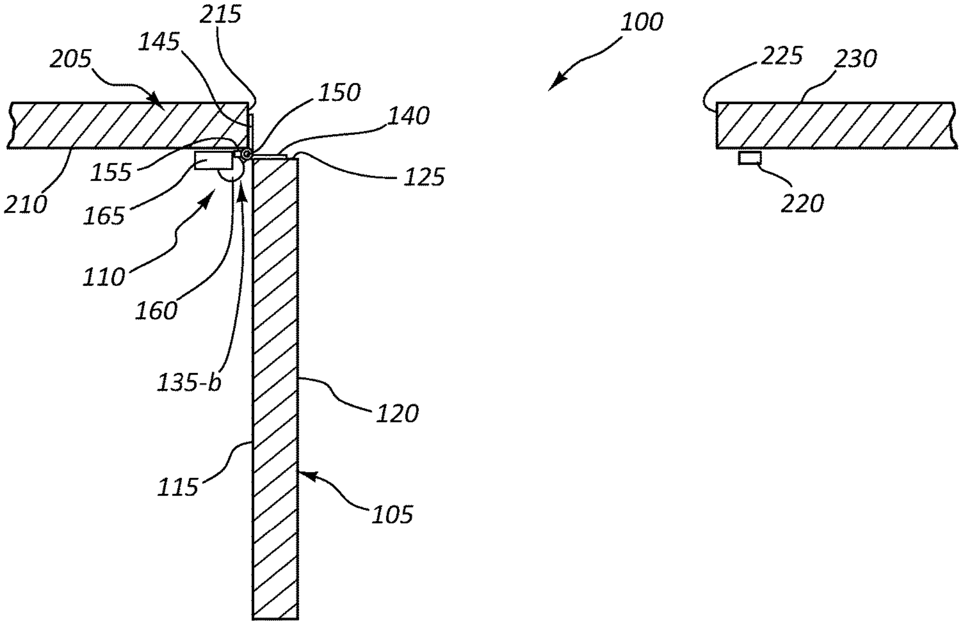
FIG. 3 is a top view of the door assembly shown in FIG. 1 with the door in an open position.

FIGS. 1-3 show a door assembly 100 having a door 105, and a hinge assembly 110. Referring first to FIG. 1, the door 105 includes inside and outside surfaces 115, 120, and an end surface 125. Hinge assembly 110 includes a hinge 130 and a hinge sensor 135. The hinge assembly 110 is mounted to the door 105 with the hinge 130 mounted directly to door 105 and hinge sensor 135 mounted to hinge 130.

Hinge 130 includes first and second hinge plates 140, 145 that are connected to each other with a hinge pin 150. The first and second hinge plates 140, 145 pivot or rotate relative to each other about the hinge pin 150. The first hinge plate 140 is connected directly to door 105 (e.g., to end surface 125). The second hinge plate 145 is mounted to a support structure such as a door frame 205 (see FIGS. 2 and 3).

Hinge sensor 135 includes a mounting bracket 155, a housing 160, and a movable member 165. Mounting bracket 155 connects hinge sensor 135 to hinge 130. Mounting bracket 155 may extend from housing 160. Mounting bracket 155 may include an aperture or opening through which hinge pin 150 extends so that a portion of mounting bracket 155 is captured between a head portion of hinge pin 150 and a surface of one of first and second hinge plates 140, 145 (see FIG. 1).

Housing 160 may be interposed between mounting bracket 155 and movable member 165. Housing 160 may include a hollow interior (not shown) configured to house at least one power supply such as a battery. Housing 160 may also be configured to house other components such as, for example, a sensor, a transceiver, a magnet, a processor, memory, or the like. Housing 160 and mounting bracket 155 may maintain a fixed position relative to each other and to hinge 130.

Housing 160 may have any desired shape and size. In one example, housing 160 has a generally cylindrical shape with a circular cross-section, as shown in FIGS. 1-3. Housing 160 may include a mounting structure such as a low friction surface, an axle, a recess, or other feature sized and arranged for interfacing with movable member 165.

Movable member 165 may extend from at least one of mounting bracket 155 and housing 160. Movable member 165 may be movable relative to housing 160. In at least one example, movable member 165 rotates about a longitudinal axis of hinge pin 150. Relative movement between movable member 165 and housing 160 may be detected and measured as part of determining an open state and/or an open position of door 105. Data from hinge sensor 135 may be translated wirelessly to a remotely located controller. The controller may be part of, for example, a home automation system.

Referring to FIG. 2, door assembly 100 is shown with door 105 in a closed position relative to door frame 205. Door frame 205 includes an inner surface 210, an outer surface 230, and an inside surface 215. First hinge plate 140 is mounted to end surface 125 of door 105. Second hinge plate 145 is mounted to inside surface 215 of door frame 205. Movable member 165 is arranged in contact with inner surface 210 of door frame 205. In other arrangements, movable member 165 may be arranged in contact with inside surface 115 of door 105 rather than a surface of door frame 205.

As door 105 is moved from a closed position shown in FIG. 2 to the open position shown in FIG. 3, the movable member 165 rotates relative to housing 160. The relative movement between movable member 165 and housing 160 and/or the absolute position of movable member 165 relative to another feature of hinge assembly 110 (e.g., first hinge plate 140, mounting bracket 155, a magnet or other reference feature mounted to, for example, housing 160) may be measured by a sensor feature of hinge sensor 135. Hinge sensor 135 may determine an angular position of movable member 165 by a change in angular position, a distance of separation, or a change in separation distance between movable member 165 and other features of hinge assembly 110. The measured values corresponding to a position of movable member 165 may be converted into information related to a position of door 105 relative to door frame 205 (i.e., an open or closed position, or a rotated position of the door in any of an infinite number of open positions).

Figure 4:
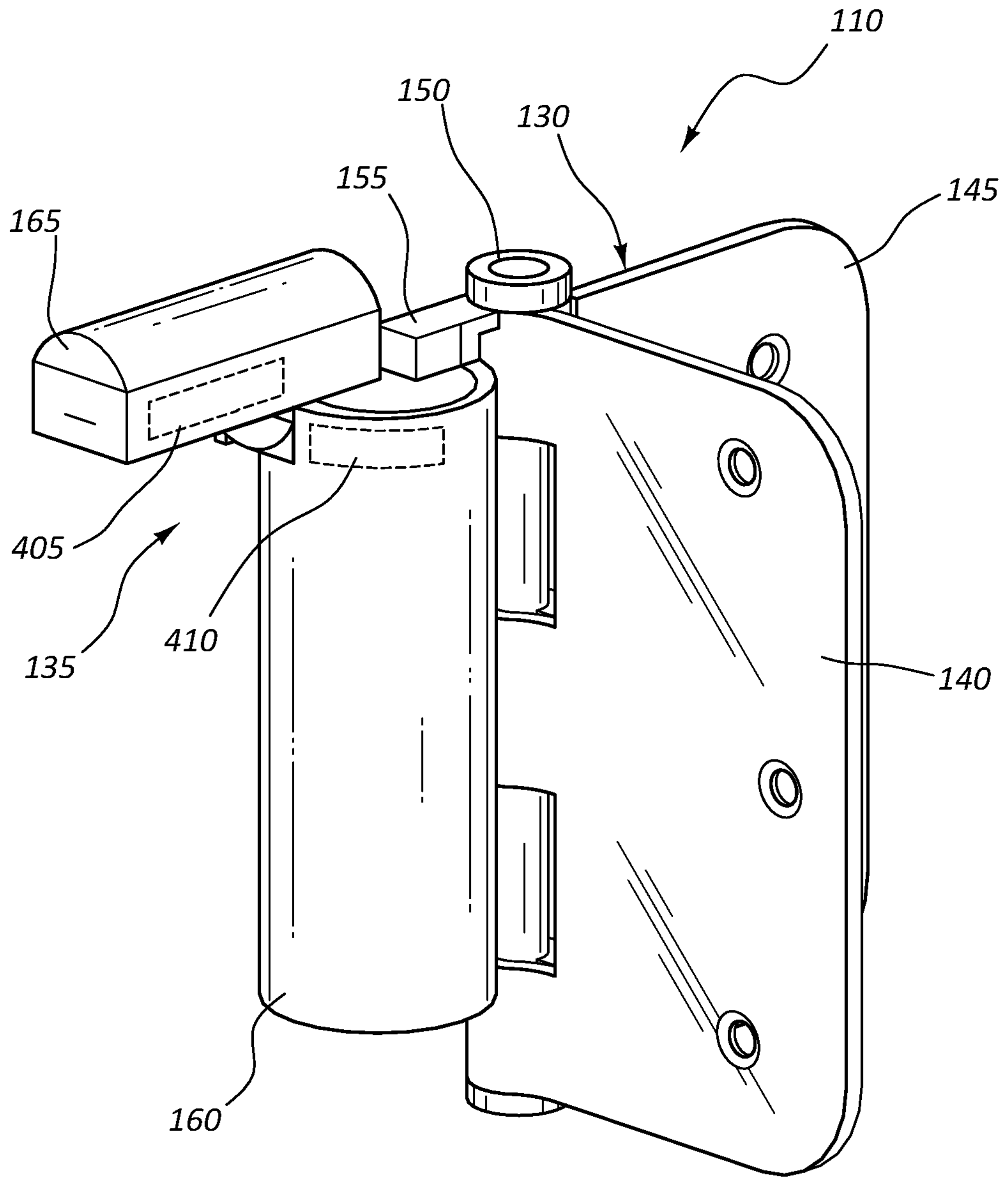
FIG. 4 is a perspective view of the hinge assembly shown in FIG. 1.
Figure 5:
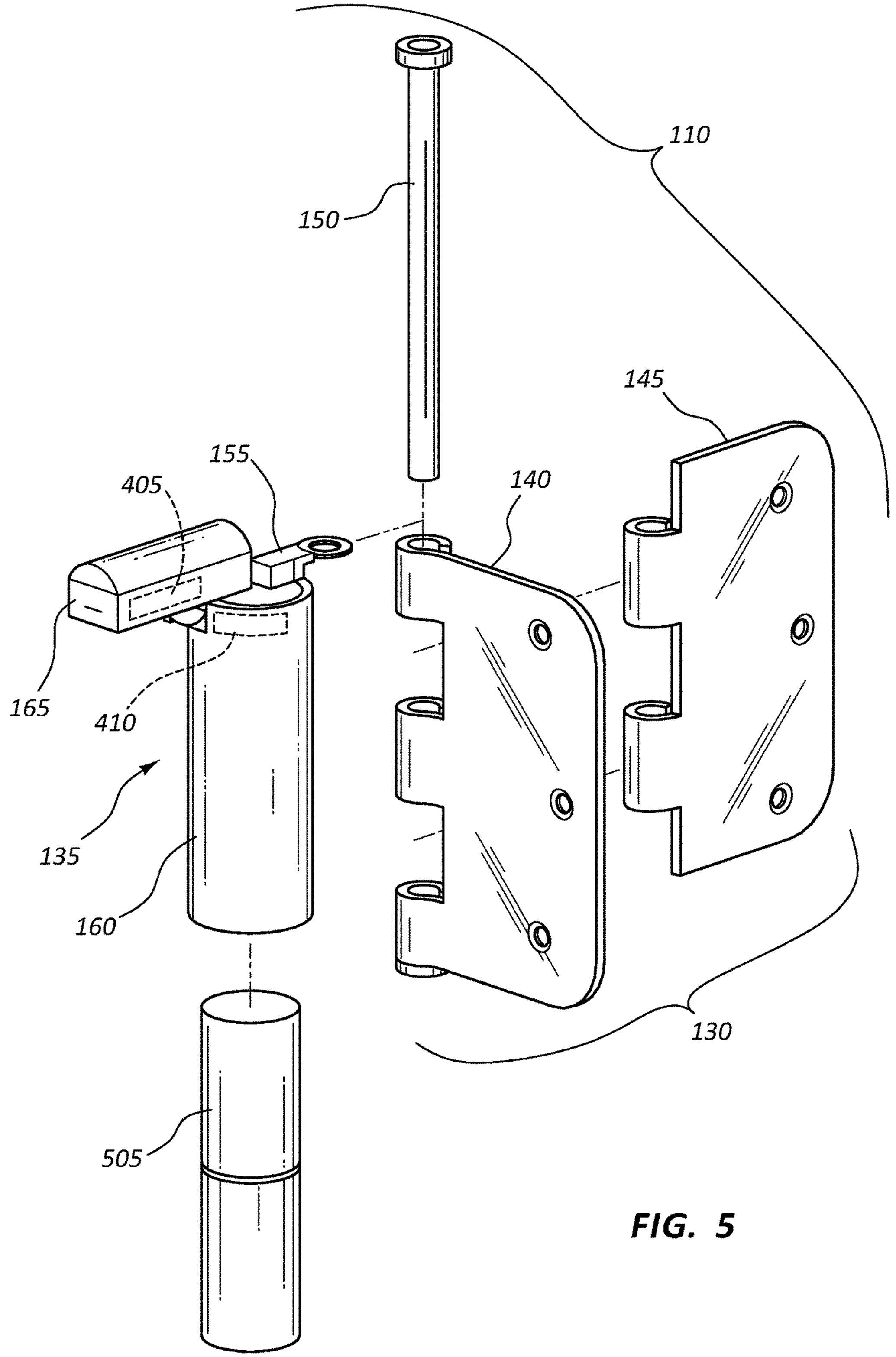
FIG. 5 is an exploded perspective view of the hinge assembly shown in FIG. 1.

FIGS. 4 and 5 illustrate the hinge assembly 110 in further detail. FIG. 4 shows a sensor 405 included with the movable member 165. Alternatively, sensor 405 may be mounted to housing 160. Sensor 405 may include any of a number of sensors including, for example, a passive or active infrared (IR) sensor, a potentiometer, or other type of positioning sensor. In one embodiment, sensor 405 may include a motion sensor. Sensor 405 may be configured to determine relative motion between any of door 105, hinge assembly 110, and door frame 205. Sensor 405 may be operable to detect motion in one or more living spaced associated with door assembly 100, such as motion in or around door 105. In some embodiments, multiple sensors 405 may be included with hinge assembly 110, wherein at least one of the sensors 405 is a motion sensor configured to detect motion in or close proximity to door 105 and/or a room or other living space for which door 105 control access.

FIG. 4 also shows a transceiver 410 associated with housing 160. Alternatively, transceiver 410 may be mounted to movable member 165. Transceiver 410 may provide wireless communication with a remote source such as, for example, a controller of a home automation system. In some arrangements, transceiver 410 may be configured as a transmitter only, while in other arrangements transceiver 410 may be capable of both transmitting and receiving data wirelessly. Two-way communications with hinge assembly 110 may have advantages in some scenarios such as, for example, providing software updates, confirming functionality, or running maintenance testing from a remote location.

FIG. 5 shows a battery 505 that is received in housing 160. Battery 505 may provide power for operation of sensor 405, transceiver 410, and other electronic components of hinge sensor 135.

Referring again to FIGS. 2 and 3, door assembly 100 may further include one or more motion sensors 220. Motion sensor 220 may provide an independent determination of movement separately from operation of hinge sensor 135. For example, motion sensor 220 may be positioned on door frame 205 such as along inner surface 210 opposite a location where door 105 is mounted to inside surface 215 of door frame 205. Motion sensor 220 may operate to identify motion that occurs in or around a doorway 225 (also referred to as a door or barrier opening 225) defined by door frame 205, or motion in close proximity to door 105. In some arrangements, motion sensor 220 may be positioned on an opposite side of door frame 205 (e.g., along outer surface 230 as shown in FIGS. 2 and 3). In other arrangements, motion sensor 220 may be mounted to hinge assembly 110, or be part of hinge sensor 135 (e.g., be arranged at the location of sensor 405 or transceiver 410 shown in FIGS. 4 and 5). Motion sensor 220 and hinge sensor 135 may be integrated or combined as a single assembly that is mounted to door 105 and/or hinge 130. In one embodiment, multiple motions sensors 220 are used, wherein one or more motions sensors may be positioned at various locations in a living space such as mounted to door frame 205, mounted to hinge sensor 135, or positioned at another location spaced away from door assembly 100.

The data collected by motion sensor 220 may be used in combination with data from hinge sensor 135 related to an open state and/or open position of door 105. In one example, hinge sensor 135 may provide data that indicates the door 105 has moved from the closed position shown in FIG. 2 to an open position sufficient to permit a person to pass through the doorway 225. The motion sensor 220 may identify motion occurring on the inner surface 210 side of door frame 205 before or after hinge sensor 135. The detected motion may confirm opening or closing of the door 105. The motion detected by motion sensor 220 may confirm that a person or other object has passed through the doorway. This additional data point of detected motion may be advantageous as compared to other scenarios in which only the open or closed state of the door is detected. In at least some situations, a door may open inadvertently (e.g., if not properly latched) and the motion sensor 220 may confirm that no object moved through the doorway, which confirms that the movement of the door may have been inadvertent.

Motion sensor 220 may be positioned at any location relative to door 105 and/or hinge assembly 110. FIGS. 2 and 3 show motion sensor 220 mounted to door frame 205. In other examples, motion sensor 220 may be positioned on a ceiling, on an opposite wall, along an overhead portion of a door frame or on the floor. Motion sensor 220 may be integrated into an appliance such as, for example, a light fixture, light switch, speaker or microphone, or control panel.

Figure 6:
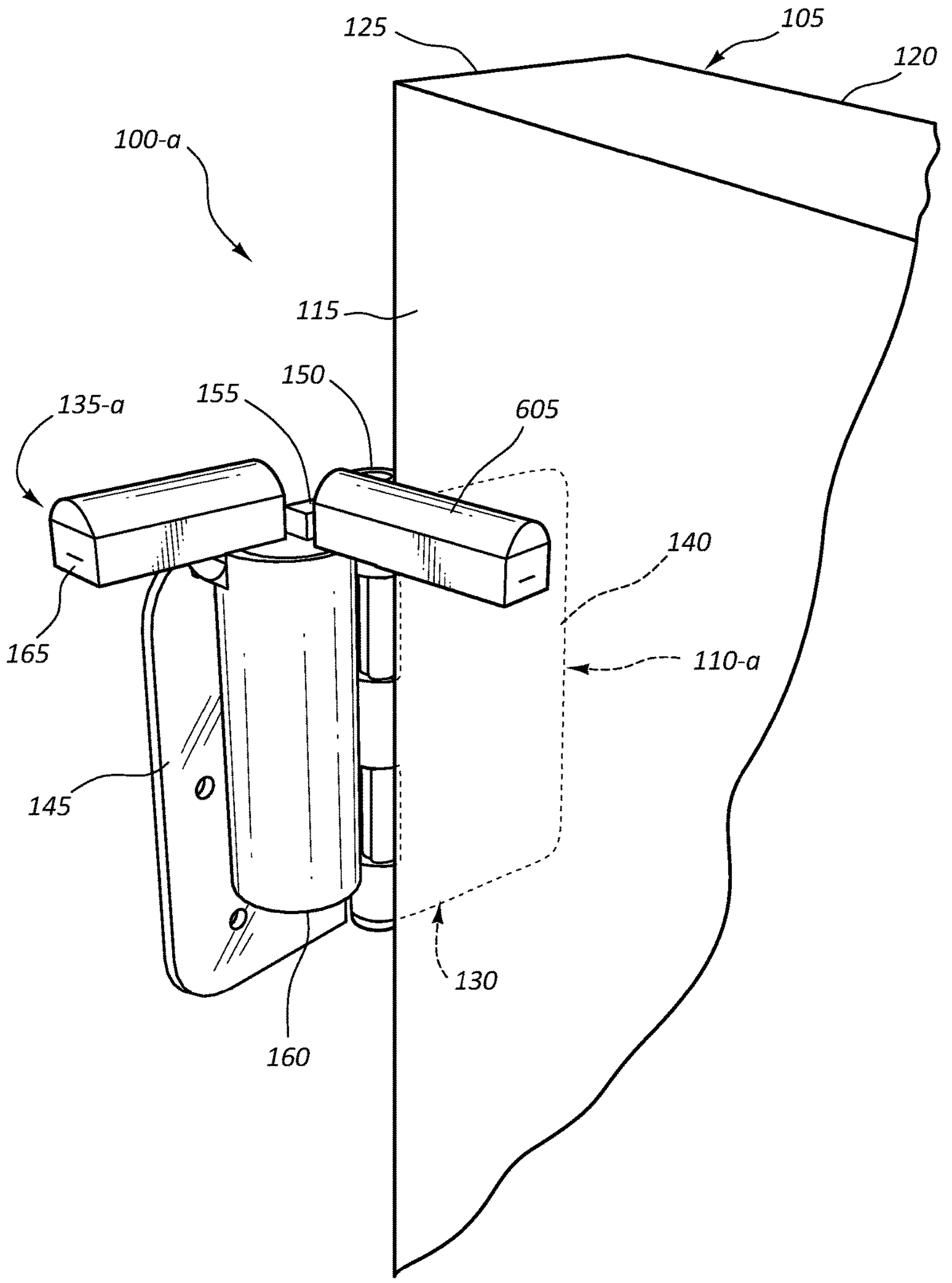
FIG. 6 is a perspective view of a door assembly having a door and a hinge assembly in which the systems and methods disclosed herein may be implemented.
Figure 7:
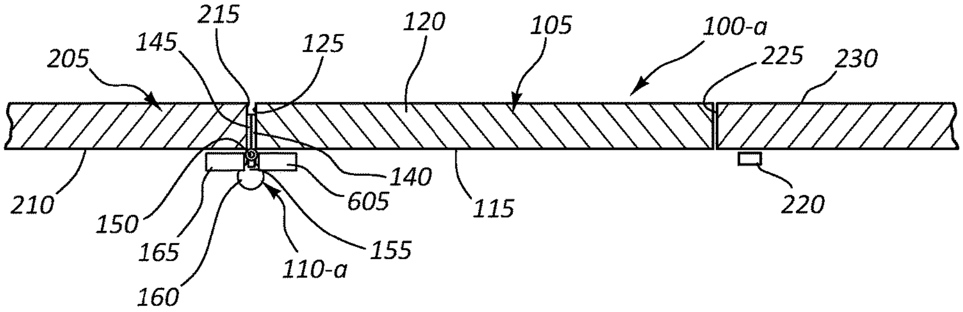
FIG. 7 is a top view of the door assembly shown in FIG. 6 with the door in a closed position.
Figure 8:
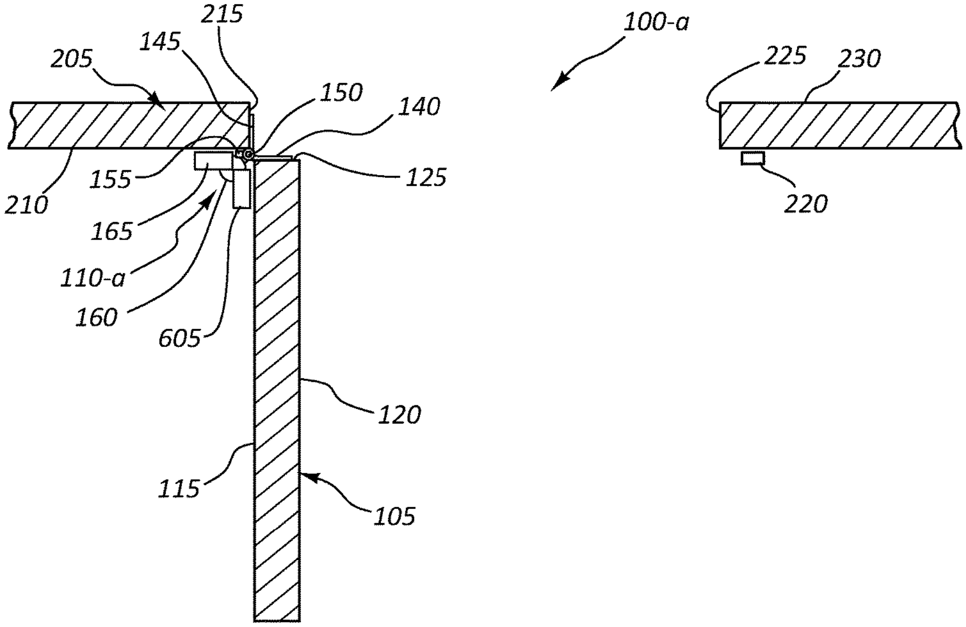
FIG. 8 is a top view of the door assembly shown in FIG. 6 with the door in an open position.

FIGS. 6-8 illustrate another example door assembly 100-*a*. FIG. 6 shows door assembly 100-*a* including door 105 and hinge assembly 110-*a*. Hinge assembly 110-*a* includes hinge 130 and a hinge sensor 135-*a*. Hinge sensor 135-*a* includes mounting bracket 155, housing 160, movable member 165, and fixed arm 605. Movable member 165 and fixed arm 605 may both be mounted to housing 160. Movable member 165 may be movable relative to mounting bracket 155, housing 160, and/or fixed arm 605. Fixed arm 605 may be fixed relative to mounting bracket 155 and housing 160. In some embodiments, movable member 165 and fixed arm 605 may be switched in position on housing 160. In other embodiments, movable member 165 and fixed arm 605 may be positioned at other locations on housing 160, such as at opposite ends of housing 160. Relative movement between movable member 165 and fixed arm 605 may be detected and/or measured as part of determining an open state and/or open position of door 105.

FIGS. 7 and 8 show hinge assembly 110-*a* mounted to door 105 and door frame 205. Movable member 165 is arranged in contact with inner surface 210 of door frame 205. Fixed arm 605 is arranged in contact with inside surface 115 of door 105. As the door 105 is moved from a closed position shown in FIG. 7 to an open position shown in FIG. 8, the movable member 165 is rotated relative to fixed arm 605. Movement of movable member 165 relative to fixed arm 605 may be measured as, for example, a change in angle, an absolute angle, a change in distance, or an absolute distance.

The movable member 165 of door assemblies 100, 100-*a* may be biased into contact with door frame 205 and/or door 105. The biasing force may be applied by one or more springs that apply a torque force that maintains contact between movable member 165 and the door frame 205 and/or door 105 depending on the arrangement of the hinge sensor 135.

Figure 9:
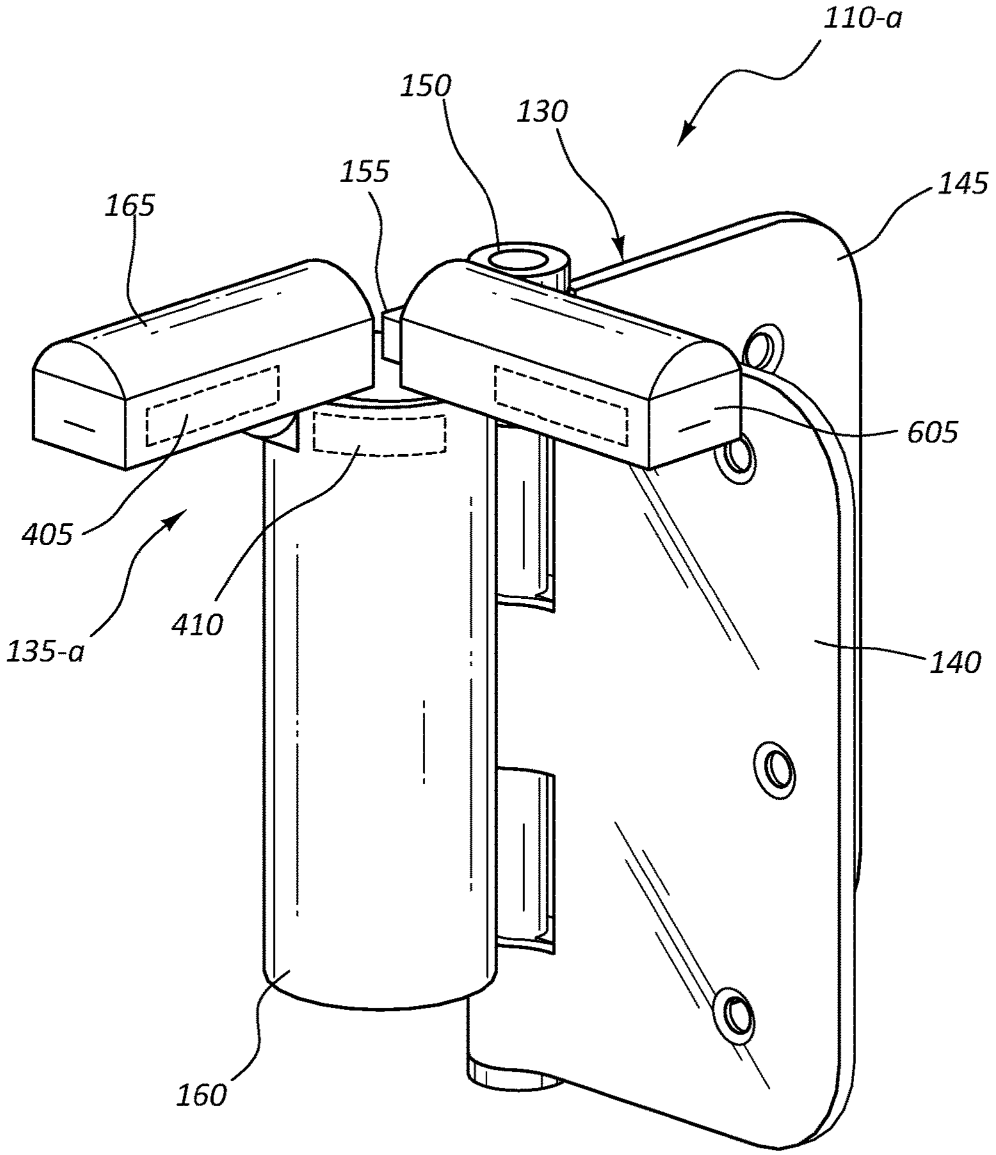
FIG. 9 is a perspective view of the hinge assembly shown in FIG. 6.
Figure 10:
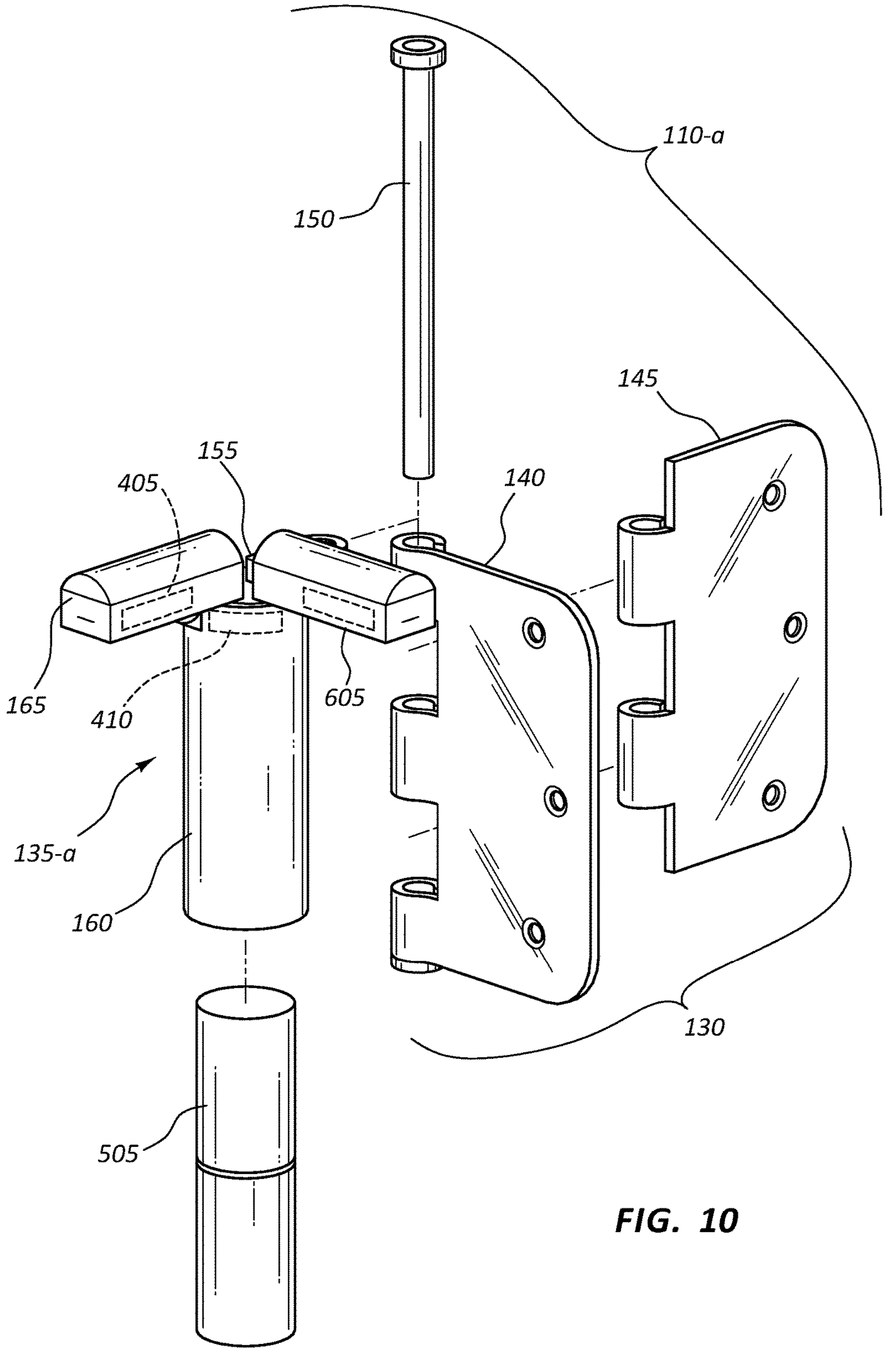
FIG. 10 is an exploded perspective view of the hinge assembly shown in FIG. 6.

FIGS. 9 and 10 show the hinge assembly 110-*a* in further detail. Hinge assembly 110-*a* includes sensor 405, transceiver 410, and battery 505, which may be carried by any one of the mounting bracket 155, housing 160, movable member 165, and fixed arm 605. In some arrangements, sensor 405, transceiver 410, and battery 505 may each be carried by a separate component of hinge assembly 110-*a*. Hinge assembly 110-*a* may also include a reference member 905 carried by, for example, fixed arm 605 or some other component of hinge assembly 110-*a* for use as a reference for sensor 405. Hinge assembly 110-*a* may include additional or fewer components as compared to those shown in FIGS. 9 and 10. For example, hinge assembly 110-*a* may include a plurality of sensors, a processor, memory, and other electronic and/or mechanical components.

The embodiments shown in FIGS. 1-10 are directed to hinge assemblies that are used with doors. Doors are just one type of barrier used to control access to an opening (e.g., doorway) of a building or other structure. The hinge assemblies disclosed herein may be used with other types of barriers such as windows.

The hinge sensors shown with reference to FIGS. 1-3 are mounted to a hinge using a hinge pin. In other examples, the hinge sensor is mounted to the hinge using other structures and/or features such as, for example, an interface between the first and second hinge plates 140, 145, a separate bracket mounted directly to either one of the first and second hinge plates 140, 145, or the like.

The hinge sensors and hinge assemblies disclosed herein may be used in combination with other features of a barrier. For example, a drive mechanism may be mounted to a barrier to apply a force that opens or closes the barrier. The operation of the drive may be controlled at least in part based on feedback from the hinge sensor. For example, the hinge sensor may indicate that the barrier is arranged at a 45° open position relative to a closed position. Alternatively, the open position of the door may be defined as a percentage (e.g., 25% open) or a distance (e.g., 18 inches open). A user may provide input for opening the door to a position of 90°, which may be carried out by operating the drive to further open the door. In another example, the hinge sensor may indicate that the barrier is in any open position. The drive may be operated to close the barrier based on, for example, a time of day, a weather condition, or some other parameter measured automatically by a home automation system or controlled manually by a user. The barrier may be confirmed closed by further feedback from the hinge sensor, a motion sensor, or other feature of the home automation system.

Figure 11:
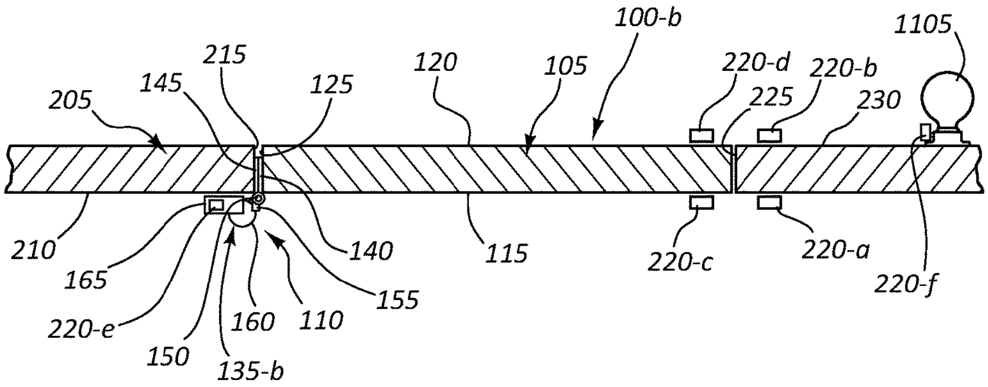
FIG. 11 is a top view of the door assembly shown in FIG. 1 in a closed position, and the door assembly including a plurality of motion sensors.
Figure 12:
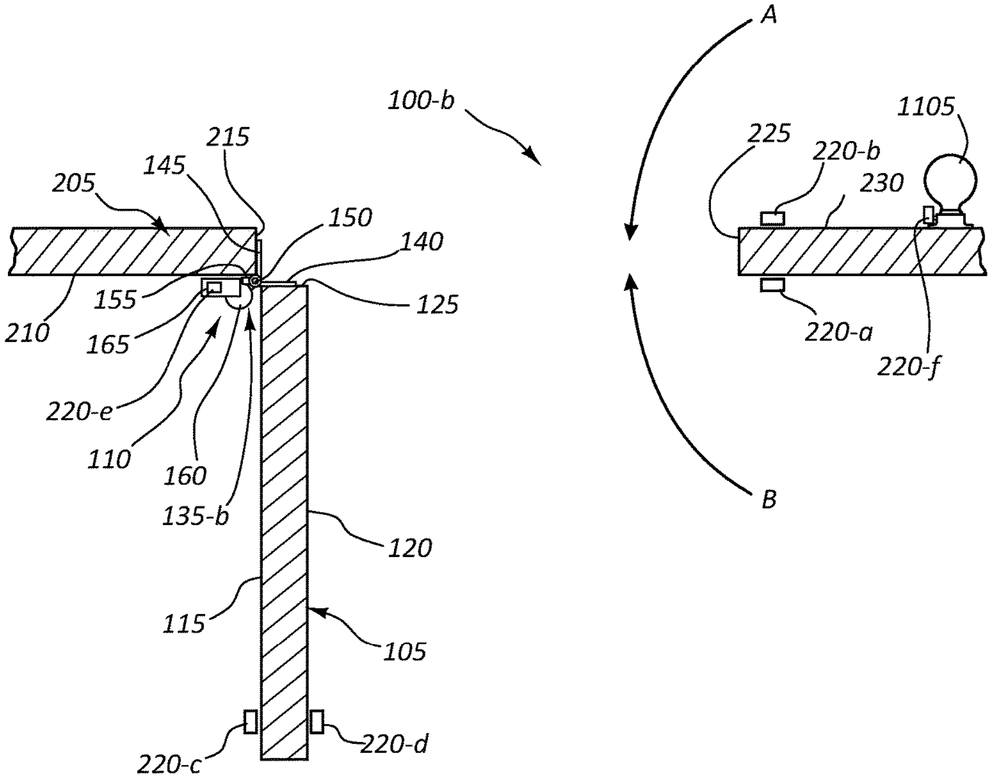
FIG. 12 is a top view of the door assembly shown in FIG. 11 with the door in an open position.

FIGS. 11 and 12 show a door assembly 100-*b* with a plurality of motion sensors 220. The door assembly 100-*b* may include any combination of the motion sensors 220 shown in FIGS. 11 and 12, including a single one of the motion sensors 220. For example, door assembly 100-*b* may include motion sensors 220-*a*, 220-*b* positioned on inner and outer surfaces 210, 230, respectively, adjacent to door opening 225. In other embodiments, motion sensors 220-*c*, 220-*d* are positioned on inside and outside surfaces 115, 120, respectively, of door 105. In still further embodiments, a motion sensor 220-*e* may be housed in or otherwise carried by hinge assembly 110, such as on a hinge sensor 135-*b*. Some embodiments may include a motion sensor 220-*f* positioned on a light fixture 1105 or other device or component that is positioned in proximity to the door opening, or in any location that permits detection of motion adjacent to or through the door opening 225.

The detection of motion by one or more of motion sensors 220 shown in any of FIGS. 1-12 may be used to determine a direction of motion of an object passing through the door opening. In one embodiment, the motion detected by one or more of motion sensors 220 may be used in combination with detected movement of door 105 by hinge sensor 135. The timing or sequence of when the motion is detected relative to when the door movement is detected may indicate the direction of movement of the object through the door opening. Referring to FIG. 12, if motion sensor 220-*b*, 220-*d*, and/or 220-*f* detects motion within a predetermined time period before hinge sensor 135-*b* detects movement of door 105, it is likely that an object is moving through the door opening in direction A (e.g., entering a living space; also referred to as ingress). If motion sensors 220-*b*, 220-*d* and/or 220-*f* detect motion within a predetermined time period after hinge sensor 135-*b* detection movement of door 105, it is likely that an object is moving through the door opening in direction B (e.g., existing a living space; also referred to as egress). The reverse timing may apply when using motion sensors 220-*a*, 220-*c* and/or 220-*e*.

In some embodiments, two or more motion sensors 220 may be used to provide increased certainty about the direction of movement for the object passing through the door opening. For example, motion detection by one of motion sensors 220-*a*, 220-*c*, 220-*e* within a predetermined time before hinge sensor 135-*b* detects movement of door 105 in combination with motion detection by one of motion sensors 220-*b*, 220-*e*, 220-*f* within a predetermined time after hinge sensor 135-*b* detects movement of door 105 may provide increased assurance of the object moving through the door opening in direction B.

The motions sensors 220 may be arranged and/or configured to detect certain types of motion (e.g., swinging movement of door 105), detect specific sized objects (e.g., objects of a minimum height such as a person verses a pet), and/or ignore movement of specified objects (e.g., movement of door 105 or other objects known to not pass through the door opening). The motions sensors 220 may operate in conjunction with other types of sensors (e.g., infrared sensors) to confirm that the object being detected is a living object. In one example, the motion detection may be coupled with detected operation of a door handle, door locking mechanism, or door opening/closing mechanism to provide additional confirmation of the original position of the object or activity of the object associated with the door movement occurring.

Figure 13:
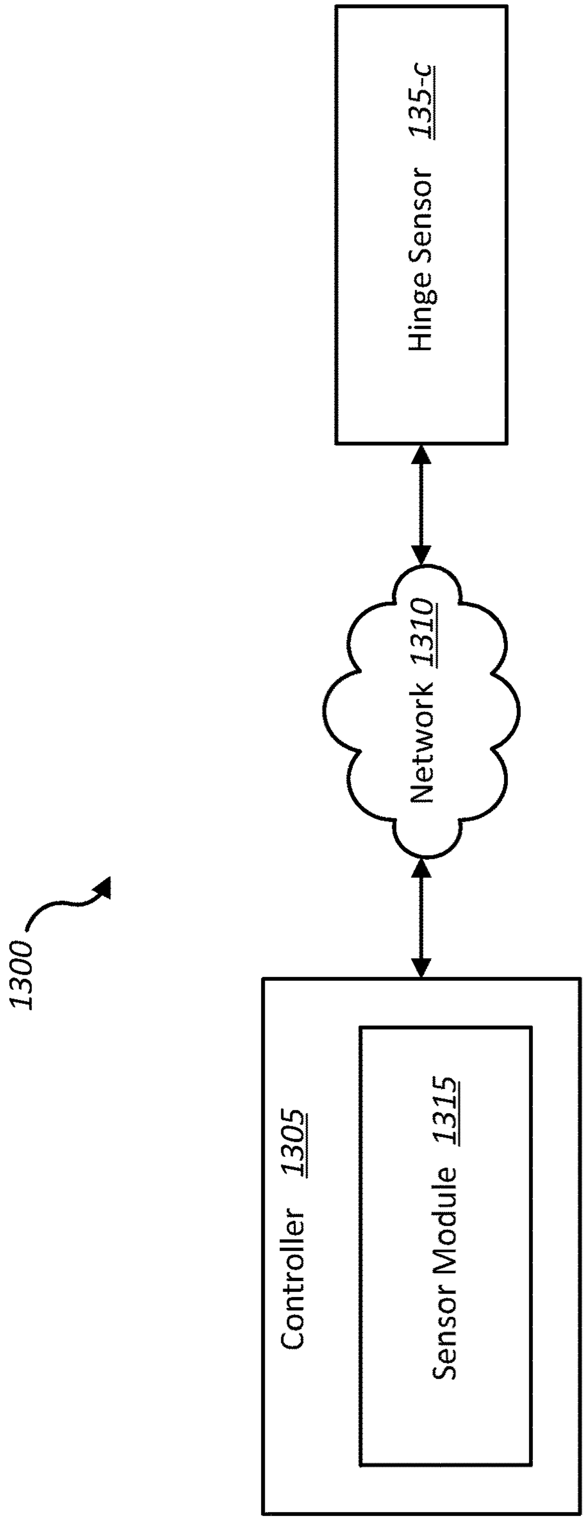
FIG. 13 is a block diagram of an environment in which the present systems and methods may be implemented.

FIG. 13 is a block diagram illustrating one embodiment of an environment 1300 in which the present systems and methods may be implemented. In some embodiments, the systems and methods described herein may be performed on or using a hinge sensor 135-*c* that communicates with a controller 1305 via a network 1310. Controller 1305 includes a sensor module 1315. Hinge sensor 135-*c* may generate and transmit information concerning an open state and/or position of a barrier such as a door or window with which the hinge sensor 135-*c* is operated. The sensor signals and/or other information generated by hinge sensor 135-*c* may be transmitted over network 1310 to controller 1305. Sensor module 1315 may determine, at least in part using the information received from hinge sensor 135-*c*, an operation state and/or position of the barrier. The network 1310 provides communication via, for example, a wired or wireless connection.

Hinge sensor 135-*c* may include one or more sensors and operate to determine at least one operational parameter or characteristic of a barrier (e.g., as described above with reference to FIGS. 1-10). For example, hinge sensor 135-*c* may determine whether a barrier (e.g., a door or window of a building) is in a closed state or in an open state. In another example, hinge sensor 135-*c* may indicate an open position of a barrier or a change in position of an open barrier (e.g., a change between a 30° rotated position and a 90° rotated position when a closed position is at 0°).

In examples where hinge sensor 135-*c* includes a plurality of different sensors, one sensor may provide one set of information related to the barrier (e.g., an open or closed state of the barrier) and another sensor may indicate a rotated or other open position of the barrier relative to the closed position. The combination of information provided by the various sensors may be utilized by the sensor module 1315 to determine an operation state or position of the barrier. In another example, an additional sensor may determine motion of the barrier itself or other objects that pass through or are in close proximity to the opening controlled by the barrier. For example, a motion sensor (e.g., motion sensor 220 described with reference to FIGS. 2 and 3) may be part of or associated with hinge sensor 135-*c*. The various sensors and functionality of hinge sensor 135-*c* may help determine from which side a barrier is opened (e.g., on an interior side or an exterior side of the barrier), or whether an object has passed through the opening whose access is controlled by the barrier. Information related to which side of a barrier the barrier is being operated and/or whether an object passes through the opening controlled by the barrier may be helpful in deducing other types of information, patterns, occupant locations, etc., that may be used to provide other features and functionality related to, for example, the barrier itself and/or a home automation system within which the controller 1305, network 1310, and hinge sensor 135-*c* operate.

In some examples, environment 1300 represents at least a portion of a home automation system. The controller 1305 may be part of, for example, a control panel of the home automation system. The hinge sensor 135-*c* may be associated with a barrier that provides an access point into a home (e.g., a door or window). Network 1310 may include or be part of a wireless network, a wired network, or some combination thereof.

Figure 14:
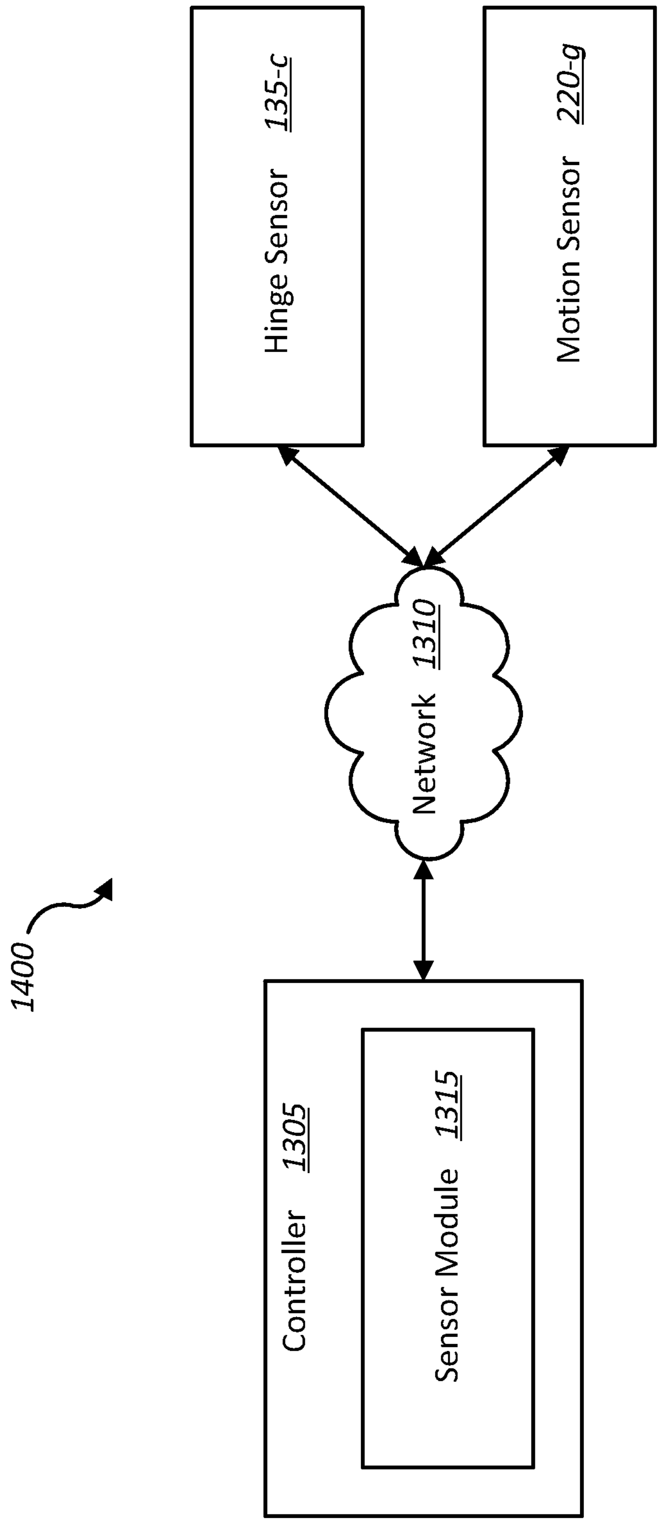
FIG. 14 is a block diagram of another environment in which the present systems and methods may be implemented.

FIG. 14 is a block diagram illustrating another embodiment of an environment 1400 in which the present systems and methods may be implemented. The environment 1400 may include network 1310, sensor module 1315, and hinge sensor 135-*c*, which may be examples of the same numbered features described above with reference to environment 1300. The environment 1400 may also include a motion sensor 220-*g*. The motion sensor 220-*g* may be one example of any one of the motion sensors 220 described with reference to FIGS. 2, 3, 7, 8, 11 and 12. Sensor module 1315 may be operated on the controller 1305 described with reference to FIG. 13, the hinge sensor 135-*c*, motion sensor 220-*g*, a remotely located device such as a control panel of an automation and/or security system, or the like.

The sensor module 1315 may receive data from hinge sensor 135-*c* related to movement of a barrier such as door 105 described with reference to FIGS. 1-12. The sensor module 1315 may also receive data from motion sensor 220-*g* related to objects moving through or in close proximity to an opening that is controlled by the barrier. In at least some embodiments, a direction of movement of an object through the opening may be determined using both the barrier movement data from hinge sensor 135-*c* and the motion detection data from motion sensor 220-*g*. The timing of when the motion is detected by motion sensor 220-*g* relative to when the barrier movement is detected by hinge sensor 135-*c* may indicate what side of the barrier the object (e.g., person) is located on either before or after the door opens.

The barrier movement detected by hinge sensor 135-*c* may include first determining a start position for the barrier. The start position may be a confirmed closed position and the detected movement may be movement from the closed position toward some open position. In another example, the start position is a partially open position that is not sufficiently open for a person to pass through the opening, and the detected movement is toward a more open position.

The motion detection may occur on either an outer or inner side of the barrier. The location of the motion sensor 220-*g* may influence whether detected motion occurring before or after detection movement of the barrier indicating a person ingressing or egressing the opening. The motion detection may have increased relevance to a determination of direction of movement of a person through the opening if the detected motion occurs within a predetermined time period of when the barrier movement is detected. In one example, the predetermined time period is in the range of about 0.01 seconds to 2 seconds, and more particularly in the range of about 0.1 seconds to about 1 second. Typically, motion detected outside of the predetermined time period can be ignored.

Figure 15:
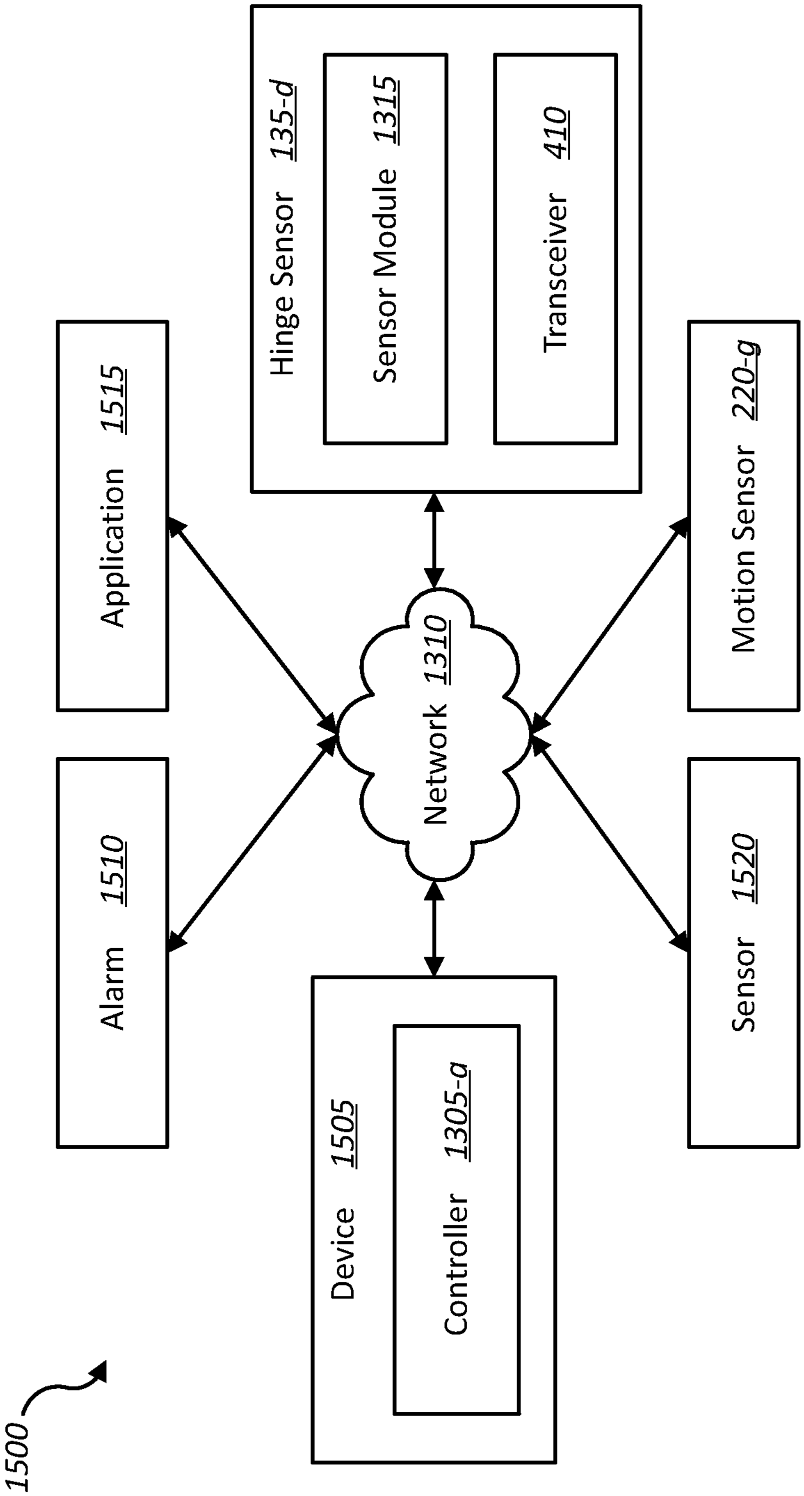
FIG. 15 is a block diagram of another environment in which the present systems and methods may be implemented.

Referring now to FIG. 15, in some embodiments, an environment 1500 may include the components of environments 1300, 1400 described above, and may further include the sensor module 1315 as part of a hinge sensor 135-*c*. Environment 1500 may also include a device 1505 to which the controller 1305-*a* belongs. In some examples, device 1505 includes, for example, a control panel of a home automation system, a back end server or a central station of the home automation system. Environment 1500 may also include an alarm 1510, an application 1515, and a sensor 1520. Hinge sensor 135-*c* may additionally include transceiver 410.

Device 1505 may include, for example, a control panel of the home automation system. Alternatively, device 1505 may be a portable electronic device including, for example, a touch screen display. Device 1505 may be in communication with one or more sensors such as hinge sensor 135-*c* via network 1310. Additionally, or alternatively, device 1505 may be in communication with other types of sensors such as, for example, sensor 1520. Device 1505 may also be in communication with alarm 1510 and application 1515.

Controller 1305-*a* may include at least some processing or logic capability and provide communication with at least some of the sensors with which device 1505 communicates (e.g., hinge sensor 135-*c*).

Alarm 1510 may provide a text message, an audible sound, lights, or the like that provide communication with one or more users on the property being monitored by a home automation system. Alarm 1510 may provide communications with a remote device or system related to a condition of the property being monitored. Alarm 1510 may be integrated into device 1505. Alarm 1510 may operate in response to data received from hinge sensor 135-*c* such as, for example, an unauthorized opening or closing of a barrier.

Application 1515 may allow a user to control (either directly or via, for example, controller 1305-*a*) an aspect of the monitored property, including a security, energy management, locking or unlocking of a barrier, checking the status of a barrier, locating a user or item, controlling lighting, thermostats, or cameras, receiving notifications regarding a current status or anomaly associated with a home, office, place of business, and the like. In some configurations, application 1515 may enable hinge sensor 135-*c* to interface with device 1505 and utilize a user interface to display automation, security, and/or energy management content on a display, user interface, mobile computing device, or other feature of environment 1500 and/or device 1505. Application 1515, via a user interface, may allow users to control aspects of their home, office, and/or other type of property. Further, application 1515 may be installed on a mobile computing device in order to allow a user to interface with functions of the components shown in environment 1500 (e.g., hinge sensor 135-*c*), such as components of a home automation and/or home security system.

Sensor 1520 may represent one or more separate sensors or a combination of two or more sensors in a single sensor device. For example, sensor 1520 may represent one or more camera sensors and one or more motion sensors connected to environment 1500. Additionally, or alternatively, sensor 1520 may represent a combination sensor such as both a camera sensor and a motion sensor integrated into the same sensor device. Additionally, or alternatively, sensor 1520 may be integrated into a home appliance or a fixture such as a light bulb fixture and/or the hinge sensor 135-*c*. Sensor 1520 may include an accelerometer to enable sensor 1520 to detect a movement. Sensor 1520 may include a wireless communication device that enables sensor 1520 to send and receive data and/or information to and from one or more devices in environment 1500 (e.g., such as a controller 1305-*a*). Additionally, or alternatively, sensor 1520 may include a GPS sensor to enable sensor 1520 to track a location of sensor 1520. Sensor 1520 may include a proximity sensor to enable sensor 1520 to detect proximity of a user relative to a predetermined distance from a dwelling (e.g., a geo fence or barrier). Sensor 1520 may include one or more security detection sensors such as, for example, a glass break sensor, a motion detection sensor, or both. Additionally, or alternatively, sensor 1520 may include a smoke detection sensor, a carbon monoxide sensor, or both. In at least some examples, sensor 1520 may detect the presence of a user within a dwelling or entryway into a home monitored by components of environment 1500, performing certain functions (e.g., opening a door or window), or speaking a voice command. Sensor 1520 may be integrated into or used in place of either one of hinge sensor 135-*c* and other sensors associated with the property being monitored by a home automation system of environment 1500. Sensor 1520 may include motion sensor 220 described above with reference to FIGS. 2-3 and 7-8.

Network 1310 may include cloud networks, local area networks (LAN), wide area networks (WAN), virtual private networks (VPN), wireless networks (using 802.11, for example), and/or cellular networks (using 3G or LTE, for example), etc. In some embodiments, the network 1310 may include the internet.

Figure 16:
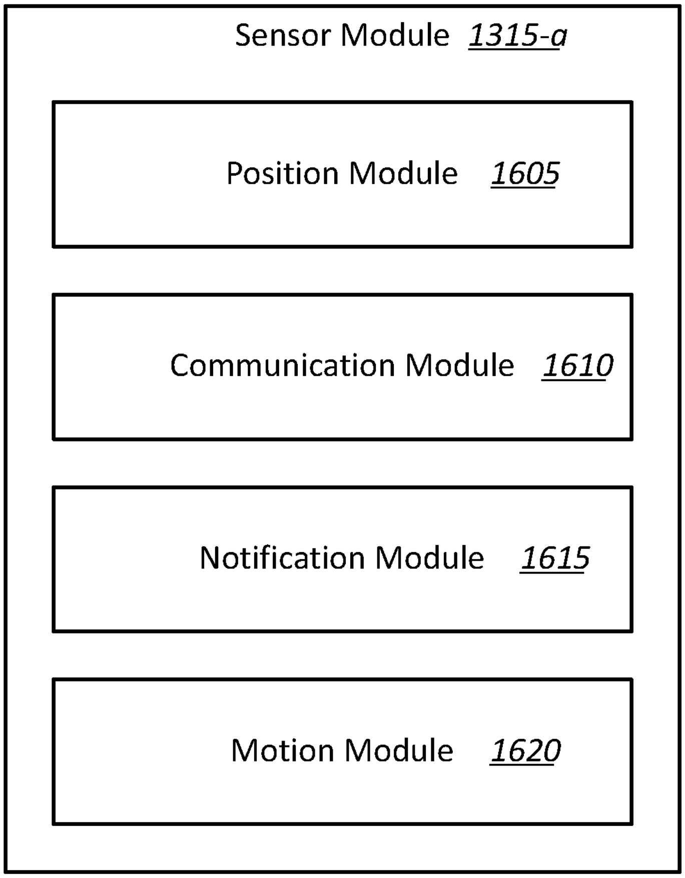
FIG. 16 is a block diagram of a sensor module.

FIG. 16 is a block diagram showing a sensor module 1315-*a*. Sensor module 1315-*a* may be one example of the sensor module 1315 shown in FIGS. 13-15. Sensor module 1315-*a* may include a position module 1605, a communication module 1610, a notification module 1615, and a motion module 1620. Position module 1605 may operate to receive information about a position of a barrier as received from, for example, a hinge sensor 135 of FIGS. 1-12. Position module 1605 may determine from data received from the hinge sensor an open or closed state of the barrier, a relative position of the barrier to a reference point (e.g., a closed state of the barrier), or a direction of change in position of the barrier, or an absolute amount of change in position of the barrier.

Communication module 1610 may provide communication to and from hinge sensor 135. In at least some examples, communication module 1610 may receive communications via, for example, transceiver 410 of hinge sensor 135 (e.g., see description of FIGS. 5 and 10). Communication module 1610 may deliver data to hinge sensor 135 such as, for example, instructions, software patches, and maintenance data. The information received from hinge sensor 135 via communication module 1610 may be provided to position module 1605.

Notification module 1615 may use position information provided by position module 1605 and determine whether the state of the barrier or other information provided by hinge sensor 135 should be communicated to another device or a user. For example, notification module 1615 may send notice to alarm 1510 to generate an audible, visual or other type of alarm based on an open or closed state or open position of the barrier as determined using hinge sensor 135. Notification module 1615 may push notifications to a user via, for example, text messages, emails, or the like via, for example, a control panel of the home automation system, a computing device such as a desktop, laptop, notebook, or handheld computing device, or the like.

Motion module 1620 may receive data from other sensors such as, for example, motion sensor 220 shown in FIGS. 2-3 and 7-8. Motion module 1320 may correlate the position information provided by hinge sensor 135 with motion information from motion sensor 220. The notification module 1615 may receive both position and motion data from position module 1605 and motion module 1620, respectively, as part of determining whether a notification should be generated and transmitted.

Figure 17:
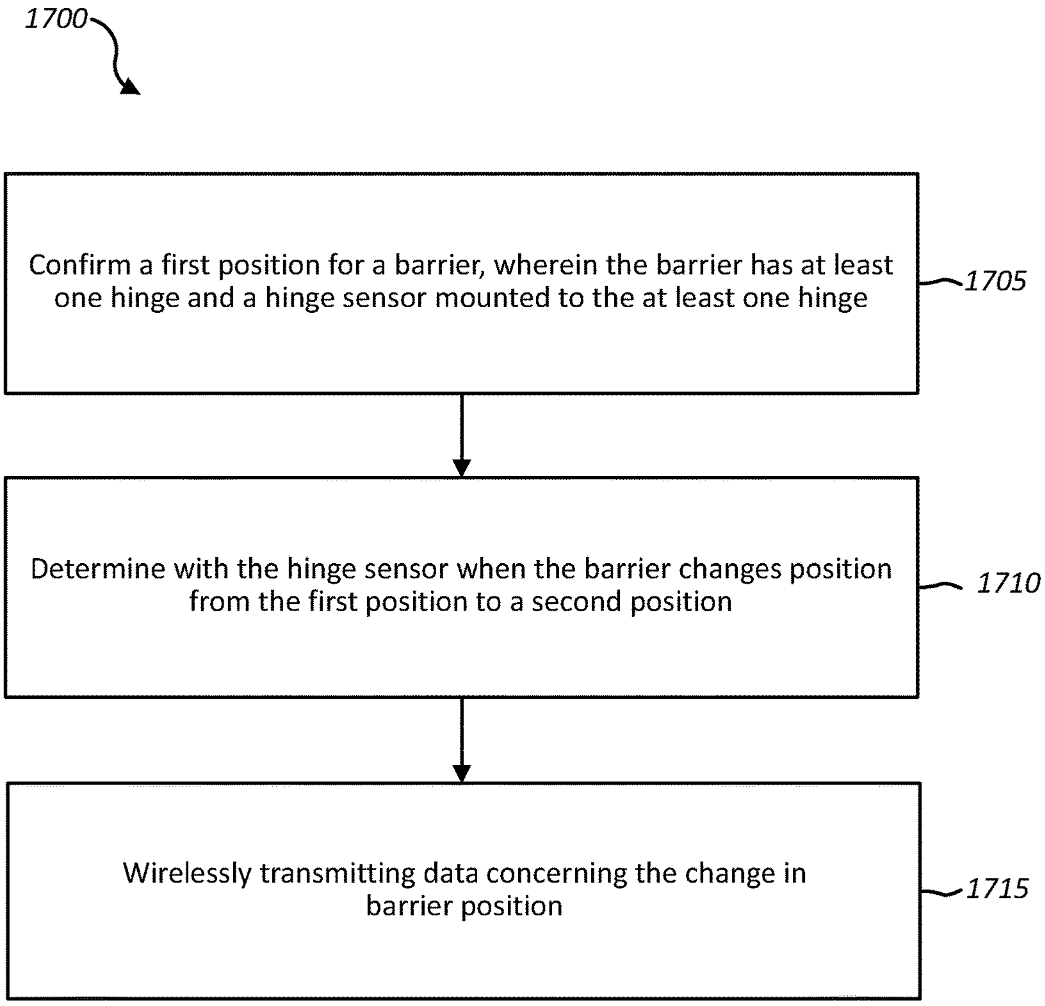
FIG. 17 is a flow diagram showing steps of an example method in accordance with the present disclosure.

FIG. 17 is a flow diagram illustrating one embodiment of a method 1700 for determining an open state of a barrier. In some configurations, the method 1700 may be implemented by the sensor module 1315 shown in FIGS. 13-16. In other examples, method 1700 may be performed generally by controller 1305 shown in FIGS. 13 and 14, hinge sensor 135-*c* shown in FIG. 13, or even more generally by the environments 1300, 1400, 1500 shown in FIGS. 13-15, respectively, or other components described with reference to FIGS. 1-15.

At block 1705, the method 1700 includes confirming a first position for the barrier, wherein the barrier has at least one hinge and a hinge sensor mounted to the at least one hinge. Block 1710 includes determining with the hinge sensor when the barrier changes position from the first position to a second position. At block 1715 of method 1700, the method includes wirelessly transmitting data concerning the change in barrier position.

Method 1700 may also include determining movement of the barrier with a motion sensor. The motion sensor may be part of the hinge sensor. The motion sensor may determine movement of an object passing through an opening that is controlled by the barrier. The hinge sensor may include a rotatable portion and a fixed portion, and the method may include fixing a position of the fixed portion relative to the hinge, and rotatably mounting the rotatable portion to the fixed portion such that the rotatable portion is arranged in contact with and movable by the barrier. The hinge sensor may include a motion sensor mounted to the fixed portion of the hinge sensor. The method 1700 may include determining with the motion sensor when an object moves through an opening that is controlled by the barrier. The first position may be a closed position and the second position may be an open position. The first position may be a first open position and the second position may be a second open position. The method 1700 may include determining at least one of the first and second positions.

Figure 18:
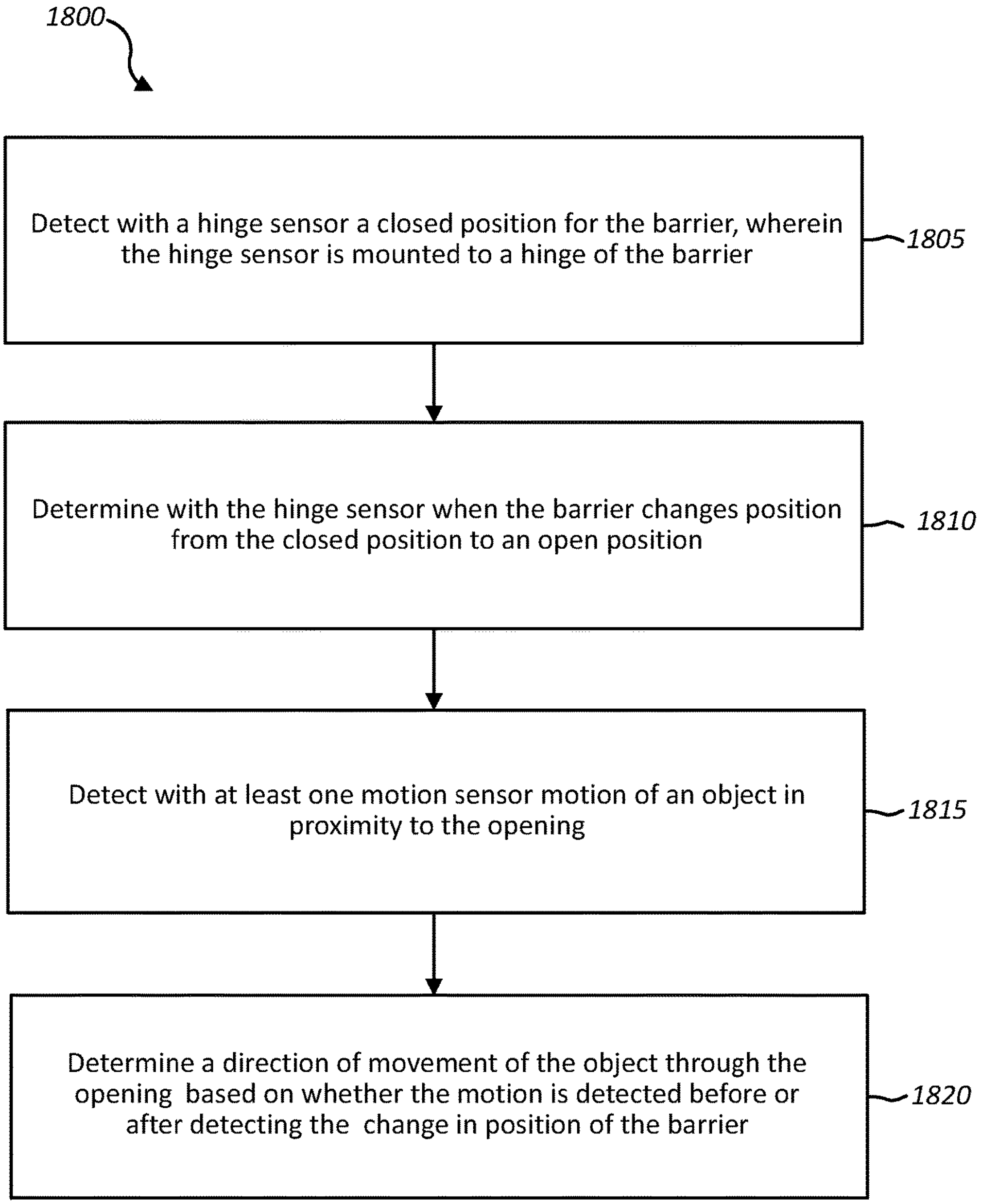
FIG. 18 is a flow diagram showing steps of another example method in accordance with the present disclosure.

FIG. 18 is a flow diagram illustrating one embodiment of a method 1800 for determining direction of passage through an opening controlled by a barrier. In some configurations, the method 1800 may be implemented by the sensor module 1315 shown in FIGS. 13-16. In other examples, method 1800 may be performed generally by controller 1305 shown in FIG. 13, hinge sensor 135-*c* shown in FIGS. 13 and 14, or even more generally by the environments 1300, 1400, 1500 shown in FIGS. 13-15, respectively, or other components described with reference to FIGS. 1-15.

At block 1805, the method 1800 includes detecting with a hinge sensor a closed position for the barrier, wherein the hinge sensor is mounted to a hinge of the barrier. The block 1810 includes determining with the hinge sensor when the barrier changes position from the closed position to an open position. The block 1815 includes detecting with at least one motion sensor motion of an object in proximity to the opening. At block 1820, the method 1800 includes determining a direction of movement of the object through the opening based on whether the motion is detected before or after detecting the change in position of the barrier. The method 1800 may also include combining the hinge sensor in a common housing with the at least one motion sensor, mounting the at least one motion sensor to the barrier, mounting the at least one motion sensor to a wall or door frame adjacent to the opening, positioning a first motion sensor on an exit side of the opening and a second motion sensor on an entry side of the opening, determining with the hinge sensor movement of the barrier between one open position and another open position, and/or determining with the hinge sensor a direction of movement of the barrier from the closed position toward the open position or from the open position toward the closed position. Determining a direction of movement of the object through the opening may include determining that the object passes through the opening in a first direction when motion is detected prior to detecting movement of the barrier, and determining that the object passes through the opening in a second direction when motion is detected after detecting movement of the barrier.

Thus, the method 1800 may provide for determining a direction of movement of a person through a door opening or other passageway. The direction of motion data may be transmitted to a controller of an automation and/or security system (e.g., a control panel) as part of providing an automation and/or security function of the system. It should be noted that the method 1800 is just one implementation and that the operations of the method 1800 may be rearranged or otherwise modified such that other implementations are possible. The steps of method 1800, alone or in any combination, may be used in connection with any of the other methods and system functions described herein.

Figure 19:
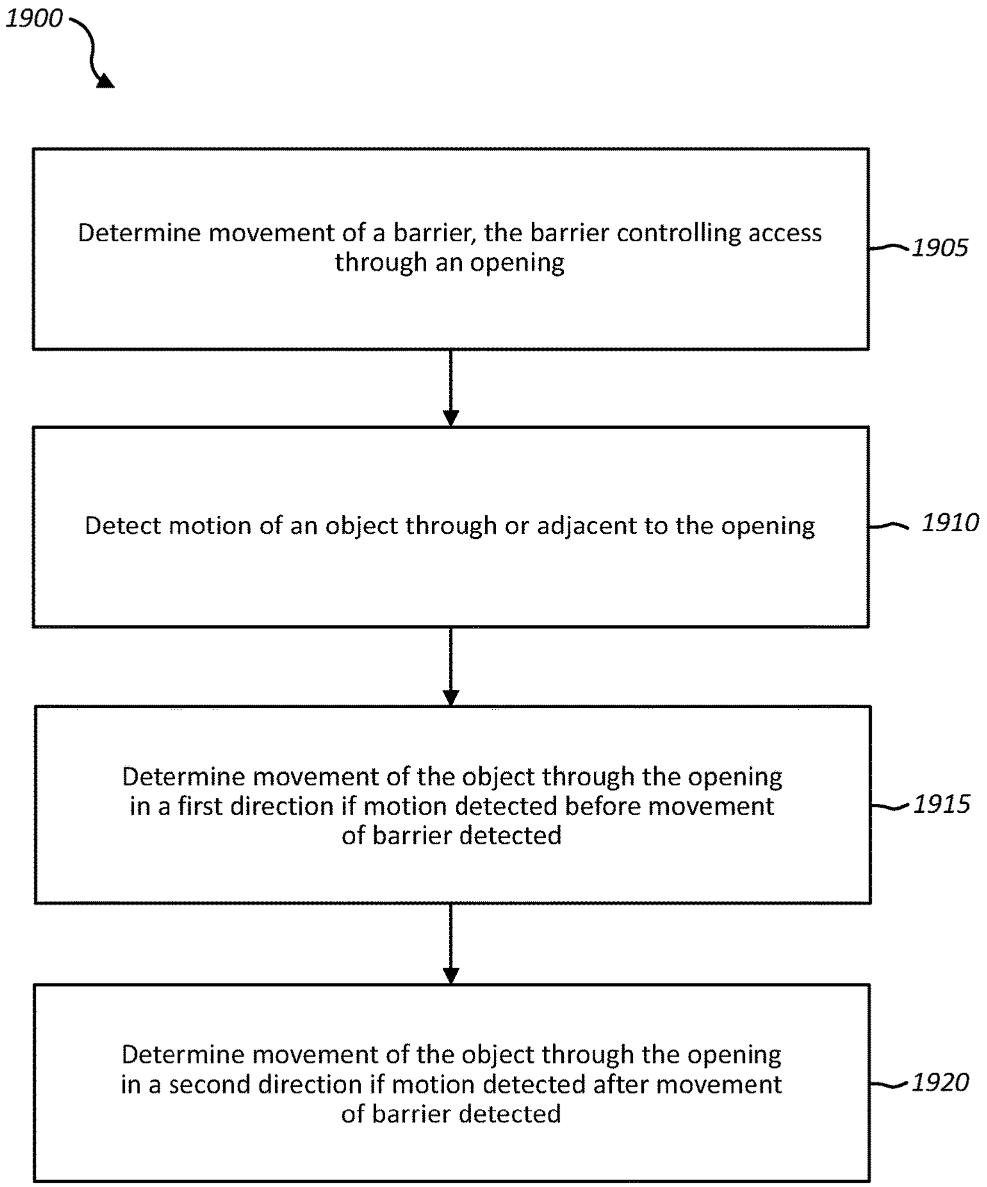
FIG. 19 is a flow diagram showing steps of another example method in accordance with the present disclosure.

FIG. 19 is a flow diagram illustrating one embodiment of a method 1900 for determining direction of passage through an opening controlled by a barrier. In some configurations, the method 1900 may be implemented by the sensor module 1315 shown in FIGS. 13-16. In other examples, the method 1900 may be performed generally by controller 1305 shown in FIG. 13, hinge sensor 135-*c* shown in FIGS. 13 and 14, or even more generally by the environments 1300, 1400, 1500 shown in FIGS. 13-15, respectively, or other components described with reference to FIGS. 1-15.

At block 1905, the method 1900 includes determining movement of a barrier, wherein the barrier controls access through an opening. Block 1910 includes detecting motion of an object through or adjacent to the opening. Block 1915 includes determining movement of the object through the opening in a first direction if motion is detected before movement of the barrier is detected. At block 1920, method 1900 includes determining movement of the object through the opening in a second direction if motion is detected after movement of the barrier is detected.

Thus, the method 1900 may provide for determining a direction of movement of a person or other object through a door opening or other passageway of a building or property. The direction of motion data may be transmitted to a controller of an automation and/or security system (e.g., a control panel) as part of providing an automation and/or security function of the system. It should be noted that the method 1900 is just one implementation and that the operations of the method 1900 may be rearranged or otherwise modified such that other implementations are possible. The steps of method 1900, alone or in any combination, may be used in connection with any of the other methods and system functions described herein.

Figure 20:
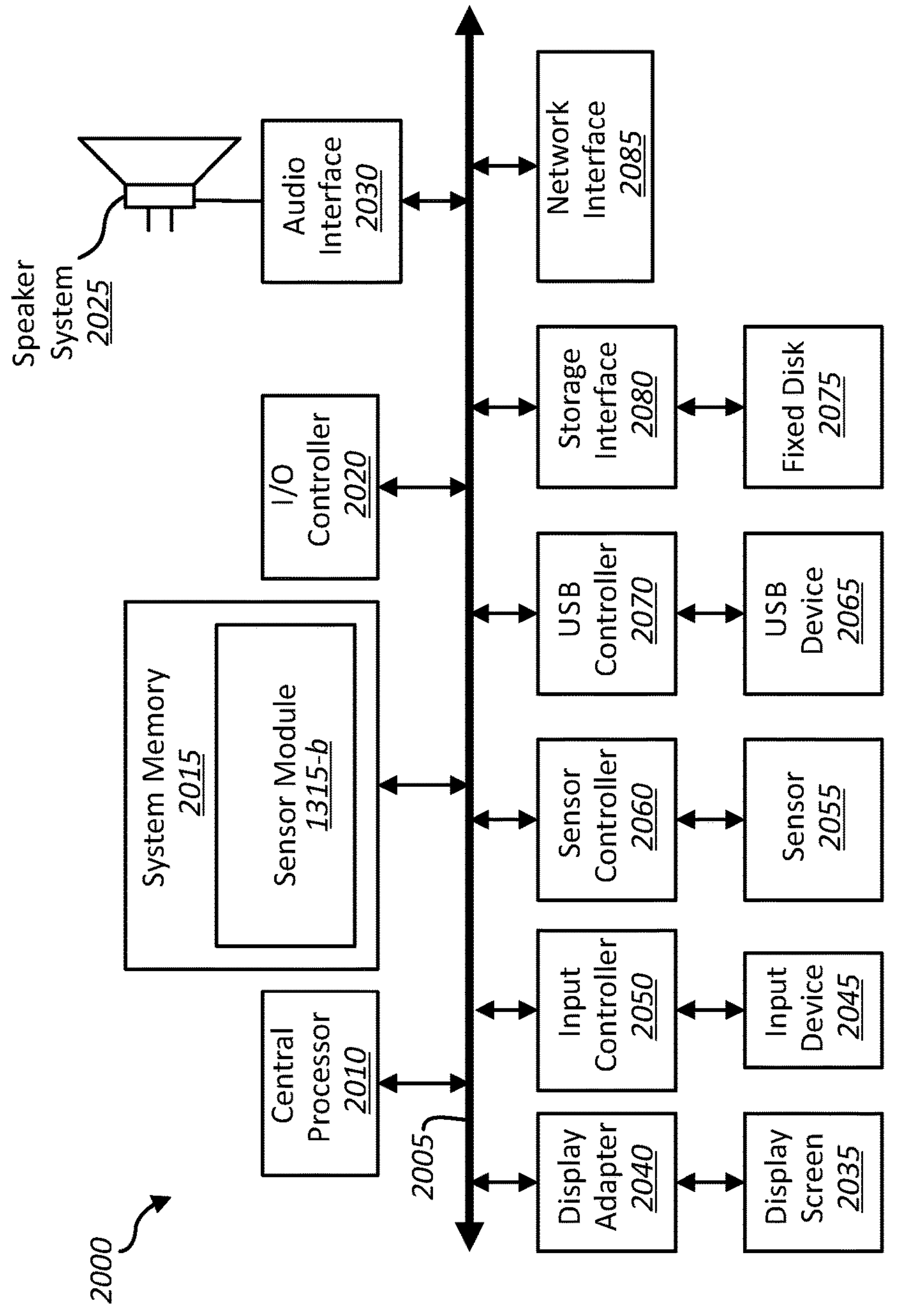
FIG. 20 is a block diagram of a computer system suitable for implementing the systems and methods of FIGS. 1-19.

FIG. 20 depicts a block diagram of a controller 2000 suitable for implementing the present systems and methods. The controller 2000 may be an example of the controller 1305 illustrated in FIGS. 13-15. In one configuration, controller 2000 includes a bus 2005 which interconnects major subsystems of controller 2000, such as a central processor 2010, a system memory 2015 (typically RAM, but which may also include ROM, flash RAM, or the like), an input/output controller 2020, an external audio device, such as a speaker system 2025 via an audio output interface 2030, an external device, such as a display screen 2035 via display adapter 2040, an input device 2045 (e.g., remote control device interfaced with an input controller 2050), multiple USB devices 2065 (interfaced with a USB controller 2070), and a storage interface 2080. Also included are at least one sensor 2055 connected to bus 2005 through a sensor controller 2060 and a network interface 2085 (coupled directly to bus 2005).

Bus 2005 allows data communication between central processor 2010 and system memory 2015, which may include read-only memory (ROM) or flash memory (neither shown), and random access memory (RAM) (not shown), as previously noted. The RAM is generally the main memory into which the operating system and application programs are loaded. The ROM or flash memory can contain, among other code, the Basic Input-Output system (BIOS) which controls basic hardware operation such as the interaction with peripheral components or devices. For example, a sensor module 1315-*b* to implement the present systems and methods may be stored within the system memory 2015. The sensor module 1315-*b* may be an example of the sensor module 1315 illustrated in FIGS. 13-16. Applications (e.g., application 1515) resident with controller 2000 are generally stored on and accessed via a non-transitory computer readable medium, such as a hard disk drive (e.g., fixed disk 2075) or other storage medium. Additionally, applications can be in the form of electronic signals modulated in accordance with the application and data communication technology when accessed via interface 2085.

Storage interface 2080, as with the other storage interfaces of controller 2000, can connect to a standard computer readable medium for storage and/or retrieval of information, such as a fixed disk drive 2075. Fixed disk drive 2075 may be a part of controller 2000 or may be separate and accessed through other interface systems. Network interface 2085 may provide a direct connection to a remote server via a direct network link to the Internet via a POP (point of presence). Network interface 2085 may provide such connection using wireless techniques, including digital cellular telephone connection, Cellular Digital Packet Data (CDPD) connection, digital satellite data connection, or the like. In some embodiments, one or more sensors (e.g., motion sensor, smoke sensor, glass break sensor, door sensor, window sensor, carbon monoxide sensor, and the like) connect to controller 2000 wirelessly via network interface 2085.

Many other devices or subsystems (not shown) may be connected in a similar manner (e.g., entertainment system, computing device, remote cameras, wireless key fob, wall mounted user interface device, cell radio module, battery, alarm siren, door lock, lighting system, thermostat, home appliance monitor, utility equipment monitor, and so on). Conversely, all of the devices shown in FIG. 20 need not be present to practice the present systems and methods. The devices and subsystems can be interconnected in different ways from that shown in FIG. 20. The aspect of some operations of a system such as that shown in FIG. 20 are readily known in the art and are not discussed in detail in this application. Code to implement the present disclosure can be stored in a non-transitory computer-readable medium such as one or more of system memory 2015 or fixed disk 2075. The operating system provided on controller 2000 may be iOS®, ANDROID®, MS-dOS®, MS-WINDOWS®, OS/2®, UNIX®, LINUX®, or another known operating system.

Moreover, regarding the signals described herein, those skilled in the art will recognize that a signal can be directly transmitted from a first block to a second block, or a signal can be modified (e.g., amplified, attenuated, delayed, latched, buffered, inverted, filtered, or otherwise modified) between the blocks. Although the signals of the above described embodiment are characterized as transmitted from one block to the next, other embodiments of the present systems and methods may include modified signals in place of such directly transmitted signals as long as the informational and/or functional aspect of the signal is transmitted between blocks. To some extent, a signal input at a second block can be conceptualized as a second signal derived from a first signal output from a first block due to physical limitations of the circuitry involved (e.g., there will inevitably be some attenuation and delay). Therefore, as used herein, a second signal derived from a first signal includes the first signal or any modifications to the first signal, whether due to circuit limitations or due to passage through other circuit elements which do not change the informational and/or final functional aspect of the first signal.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

Furthermore, while various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the present systems and methods and their practical applications, to thereby enable others skilled in the art to best utilize the present systems and methods and various embodiments with various modifications as may be suited to the particular use contemplated.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising." In addition, the term "based on" as used in the specification and the claims is to be construed as meaning "based at least upon."

What is claimed is:

1. A method for determining direction of passage through an opening controlled by a barrier, comprising:
- detecting with a hinge sensor a closed position for the barrier, the hinge sensor being mounted to a hinge of the barrier, the hinge sensor having a physical fixed portion and a physical rotatable portion;
- determining a position of the physical fixed portion relative to the hinge;
- determining a position of the physical rotatable portion relative to the physical fixed portion using a measured value of the hinge sensor, the measured value of the hinge sensor comprising a change in angular position and a distance of separation between the physical rotatable portion and the physical fixed portion;
- detecting with the hinge sensor the barrier changing from the closed position to an open position using the determined position of the physical fixed portion relative to the hinge and the determined position of the physical rotatable portion relative to the physical fixed portion;
- detecting, via a motion sensor, a movement of an object through the opening based at least in part on the barrier changing from the closed position to the open position, wherein the hinge sensor comprises the motion sensor; and
- determining a direction of the movement of the object through the opening based at least in part on a change in angular position and a distance of separation between the physical fixed portion and the physical rotatable portion, the movement occurring before and after the change in position of the barrier.

2. The method of claim 1, further comprising:
- wirelessly transmitting data concerning the direction of the movement of the object through the opening.

3. The method of claim 1, further comprising:
- fixing a position of the physical fixed portion relative to the hinge; and
- rotatably mounting the physical rotatable portion to the physical fixed portion, the physical rotatable portion being arranged in contact with and movable by the barrier.

4. The method of claim 1, wherein the motion sensor is mounted to the barrier.

5. The method of claim 1, wherein the motion sensor is mounted to a wall or door frame adjacent to the opening.

6. The method of claim 1, wherein the motion sensor comprises a first portion positioned on an exit side of the opening, and a second portion positioned on an entry side of the opening.

7. The method of claim 1, further comprising:

determining with the hinge sensor movement of the barrier between one open position and another open position.

8. The method of claim 1, further comprising:

determining with the hinge sensor a direction of movement of the barrier from the closed position toward the open position, or from the open position toward the closed position.

9. The method of claim 1, wherein determining the direction of the movement of the object through the opening comprises:

determining that the object passes through the opening in a first direction when motion is detected prior to detecting movement of the barrier; and determining that the object passes through the opening in a second direction when motion is detected after detecting movement of the barrier.

10. A sensor assembly for use with a barrier, comprising:

a hinge sensor mounted to a hinge of the barrier and operable to determine movement of the barrier, the hinge sensor having a physical fixed portion and a physical rotatable portion;

the hinge sensor being operable to:

determine a position of the physical fixed portion relative to the hinge;

determine a position of the physical rotatable portion relative to the physical fixed portion using a measured value of the hinge sensor, the measured value of the hinge sensor comprising a change in angular position and a distance of separation between the physical rotatable portion and the physical fixed portion; and detect the barrier changing from a closed position to an open position using the determined position of the physical fixed portion relative to the hinge and the determined position of the physical rotatable portion relative to the physical fixed portion;

the hinge sensor comprising at least one motion sensor operable to:

detect movement of an object through an opening of the barrier; and determine a direction of the movement of the object through the opening based at least in part on a distance of separation between the physical fixed portion and the physical rotatable portion, the movement occurring before and after the change in position of the barrier.

11. The sensor assembly of claim 10, wherein the hinge sensor is mounted to a hinge pin of the hinge.

12. The sensor assembly of claim 10, wherein the hinge sensor includes a first portion that maintains a fixed position relative to the barrier, and a second portion that moves relative to the barrier, and the hinge sensor determines movement of the barrier based on at least one of a relative position between the first and second portions and a change in position of the second portion.

13. The sensor assembly of claim 10, further comprising:

a wireless transmitter configured to transmit data concerning the determined direction of the movement of the object through the opening.

14. The sensor assembly of claim 10, wherein the at least one motion sensor is mounted to the hinge.

15. The sensor assembly of claim 10, wherein the at least one motion sensor includes a plurality of motion sensors configured to be arranged at different locations relative to the opening.

16. A direction of movement detecting assembly, comprising:

a hinge sensor mounted to a hinge of a barrier operable to detect movement of the barrier, the hinge sensor having a physical fixed portion and a physical rotatable portion;

the hinge sensor being operable to:

determine a position of the physical fixed portion relative to the hinge;

determine a position of the physical rotatable portion relative to the physical fixed portion using a measured value of the hinge sensor, the measured value of the hinge sensor comprising a change in angular position and a distance of separation between the physical rotatable portion and the physical fixed portion; and detect the barrier changing from a closed position to an open position using the determined position of the physical fixed portion relative to the hinge and the determined position of the physicall rotatable portion relative to the physical fixed portion;

the hinge sensor comprising at least one motion sensor operable to;

detect movement of an object through an opening of the barrier based at least in part on the changing from the closed position to the open position; and a controller operable to:

determine a direction of the movement of the object through the opening based at least in part on a distance of separation between the physical fixed portion and the physical rotatable portion, the movement occurring before and after the change in position of the barrier.

17. The assembly of claim 16, wherein the controller is located remotely from the hinge sensor and the at least one motion sensor, the assembly further comprising:

a transceiver operable to wirelessly transmit the barrier movement data and the motion data to the controller.

18. The assembly of claim 16, wherein the hinge sensor includes a fixed portion and a moveable portion, and movement of the moveable portion relative to the fixed portion indicates movement of the barrier relative to the opening.

19. The assembly of claim 16, wherein the at least one motion sensor comprises a passive infrared sensor.

* * * * *